US012566449B2

(12) United States Patent
Jia et al.

(10) Patent No.: US 12,566,449 B2
(45) Date of Patent: Mar. 3, 2026

(54) ROBOT CONTROL METHOD, ROBOT, AND STORAGE MEDIUM

(71) Applicant: HAI ROBOTICS CO., LTD.,
Shenzhen (CN)

(72) Inventors: Wenna Jia, Shenzhen (CN); Han Lin,
Shenzhen (CN); Huixiang Li, Shenzhen
(CN)

(73) Assignee: HAI ROBOTICS CO., LTD.,
Shenzhen (CN)

( * ) Notice: Subject to any disclaimer, the term of this
patent is extended or adjusted under 35
U.S.C. 154(b) by 77 days.

(21) Appl. No.: 18/612,268

(22) Filed: Mar. 21, 2024

(65) Prior Publication Data

US 2024/0231377 A1     Jul. 11, 2024

Related U.S. Application Data

(63) Continuation of application No.
PCT/CN2022/120083, filed on Sep. 21, 2022.

(30) Foreign Application Priority Data

Sep. 28, 2021     (CN) .......................... 202111144801.1

(51) Int. Cl.
G05D 1/245          (2024.01)
G05D 1/244          (2024.01)

(52) U.S. Cl.
CPC ............. G05D 1/245 (2024.01); G05D 1/244
(2024.01)

(58) Field of Classification Search
CPC ...... G05D 1/245; G05D 1/246; G05D 1/2462;
G05D 1/2465; G05D 1/43; G05D 1/49;
G05D 1/646
See application file for complete search history.

(56) References Cited

U.S. PATENT DOCUMENTS

| | | | |
|---|---|---|---|
| 2013/0184868 A1 | 7/2013 | Inazumi | |
| 2018/0321682 A1* | 11/2018 | Matsumoto | ............ G01S 19/45 |
| 2019/0061156 A1 | 2/2019 | Li et al. | |

(Continued)

FOREIGN PATENT DOCUMENTS

| | | |
|---|---|---|
| CN | 104407615 A | 3/2015 |
| CN | 105511471 A | 4/2016 |

(Continued)

OTHER PUBLICATIONS

International Search Report for PCT/CN2022/120083; Dated: Dec.
22, 2022; 6 pages.

(Continued)

*Primary Examiner* — Aaron L Troost
(74) *Attorney, Agent, or Firm* — Ladas & Parry, LLP

(57)          ABSTRACT

The present disclosure provides a robot control method, a
robot, a control terminal, and a control system. The method
includes: obtaining an environment feature around the first
robot when the first robot detects no positioning identifier;
determining a deviation distance and a deviation angle
between the first robot and a target traveling route of the first
robot according to the environment feature and traveling
information of the first robot; and controlling the first robot
to perform route correction according to the deviation dis-
tance and the deviation angle, to cause the first robot to move
to the target traveling route again.

19 Claims, 6 Drawing Sheets

(56)        References Cited

U.S. PATENT DOCUMENTS

| 2019/0160675 A1* | 5/2019 | Paschall, II ........... G05D 1/617 |
| 2019/0265722 A1* | 8/2019 | Haeusler ................ G05D 1/644 |
| 2020/0026304 A1 | 1/2020 | Thode et al. |

FOREIGN PATENT DOCUMENTS

| CN | 106325280 A | 1/2017 |
| CN | 107315414 A | 11/2017 |
| CN | 109414142 A | 3/2019 |
| CN | 111376253 A | 7/2020 |
| CN | 111791241 A | 10/2020 |
| CN | 112214012 A | 1/2021 |
| CN | 112987734 A | 6/2021 |
| CN | 113335313 A | 9/2021 |
| CN | 113878577 A | 1/2022 |
| DE | 4429016 A1 | 2/1996 |
| EP | 2202601 A2 | 6/2010 |
| JP | 2001523829 A | 11/2001 |

OTHER PUBLICATIONS

Partial supplementary search report from European Patent Application No. 22874720.0 issued on Nov. 11, 2024.

* cited by examiner

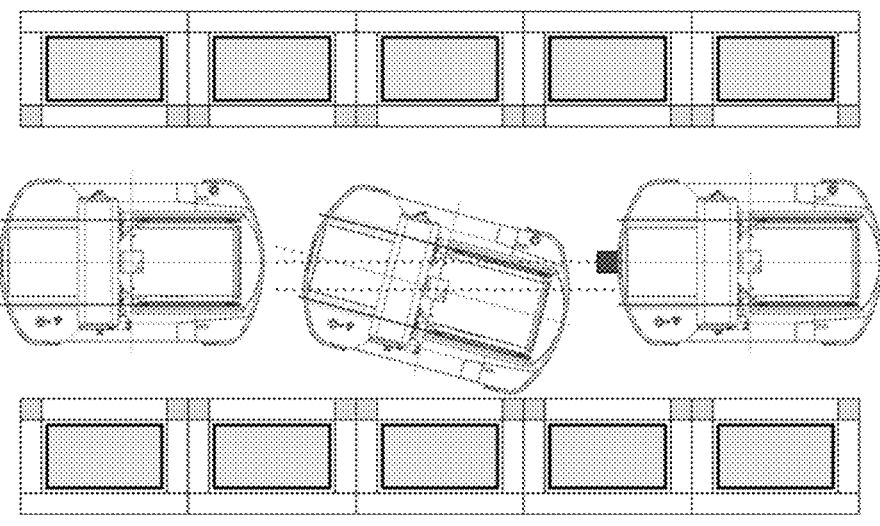

Figure 1

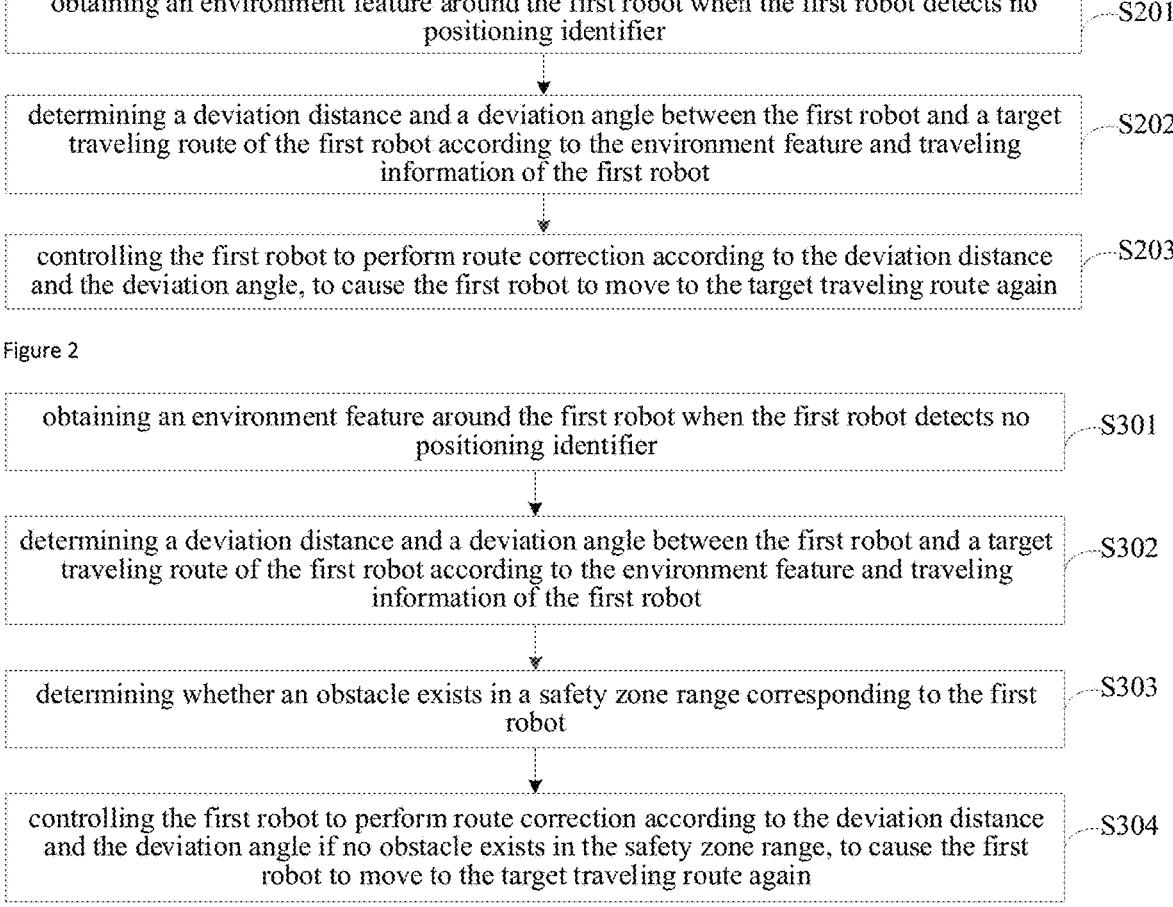

| obtaining an environment feature around the first robot when the first robot detects no positioning identifier | S201 |

↓

| determining a deviation distance and a deviation angle between the first robot and a target traveling route of the first robot according to the environment feature and traveling information of the first robot | S202 |

↓

| controlling the first robot to perform route correction according to the deviation distance and the deviation angle, to cause the first robot to move to the target traveling route again | S203 |

Figure 2

| obtaining an environment feature around the first robot when the first robot detects no positioning identifier | S301 |

↓

| determining a deviation distance and a deviation angle between the first robot and a target traveling route of the first robot according to the environment feature and traveling information of the first robot | S302 |

↓

| determining whether an obstacle exists in a safety zone range corresponding to the first robot | S303 |

↓

| controlling the first robot to perform route correction according to the deviation distance and the deviation angle if no obstacle exists in the safety zone range, to cause the first robot to move to the target traveling route again | S304 |

Figure 3

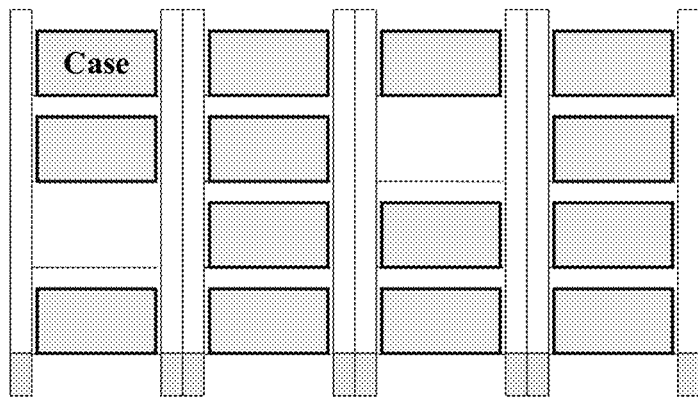
Figure 4
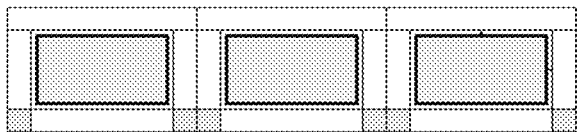
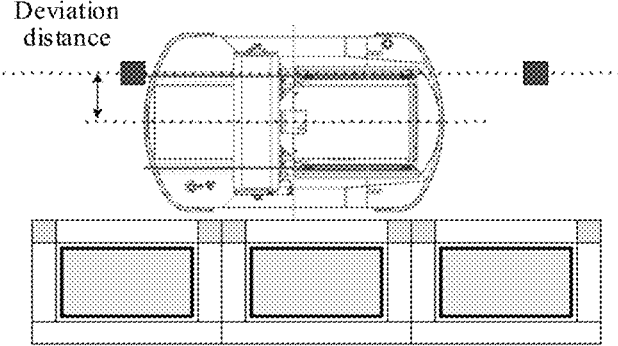
Figure 5
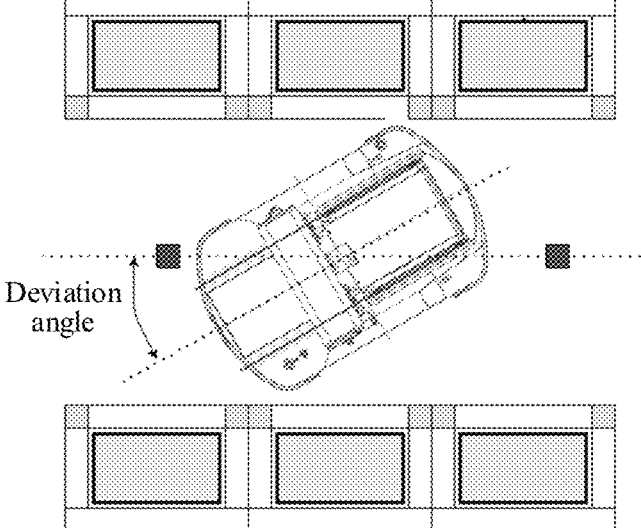
Figure 6

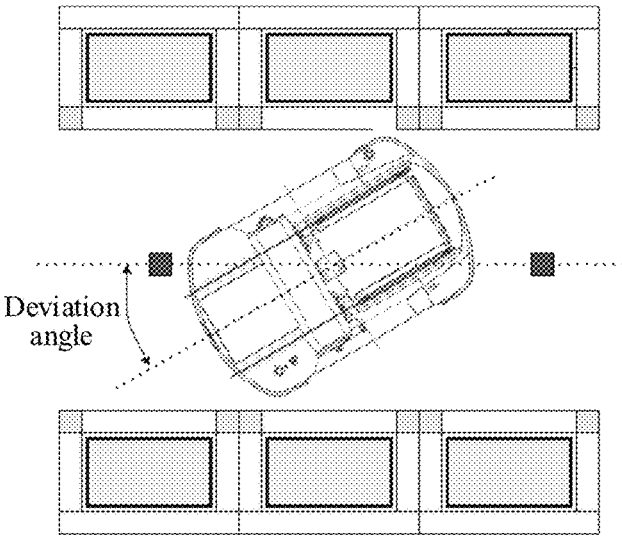

Figure 7

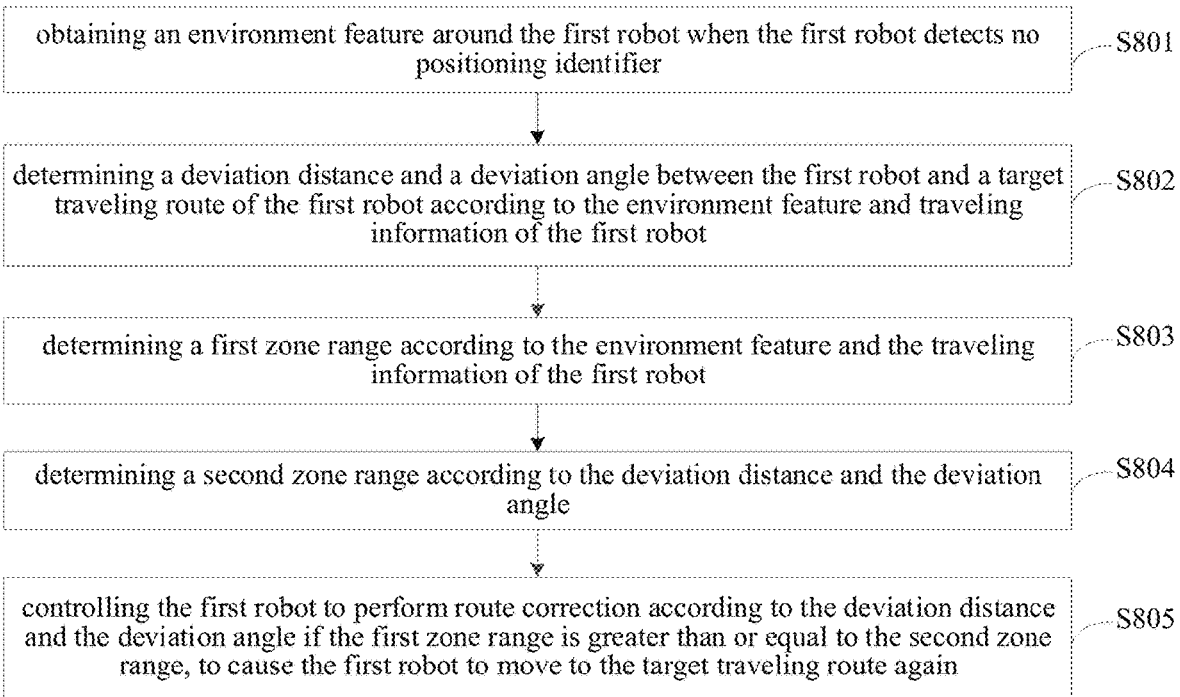

obtaining an environment feature around the first robot when the first robot detects no positioning identifier    S801 determining a deviation distance and a deviation angle between the first robot and a target traveling route of the first robot according to the environment feature and traveling information of the first robot    S802 determining a first zone range according to the environment feature and the traveling information of the first robot    S803 determining a second zone range according to the deviation distance and the deviation angle    S804 controlling the first robot to perform route correction according to the deviation distance and the deviation angle if the first zone range is greater than or equal to the second zone range, to cause the first robot to move to the target traveling route again    S805

Figure 8

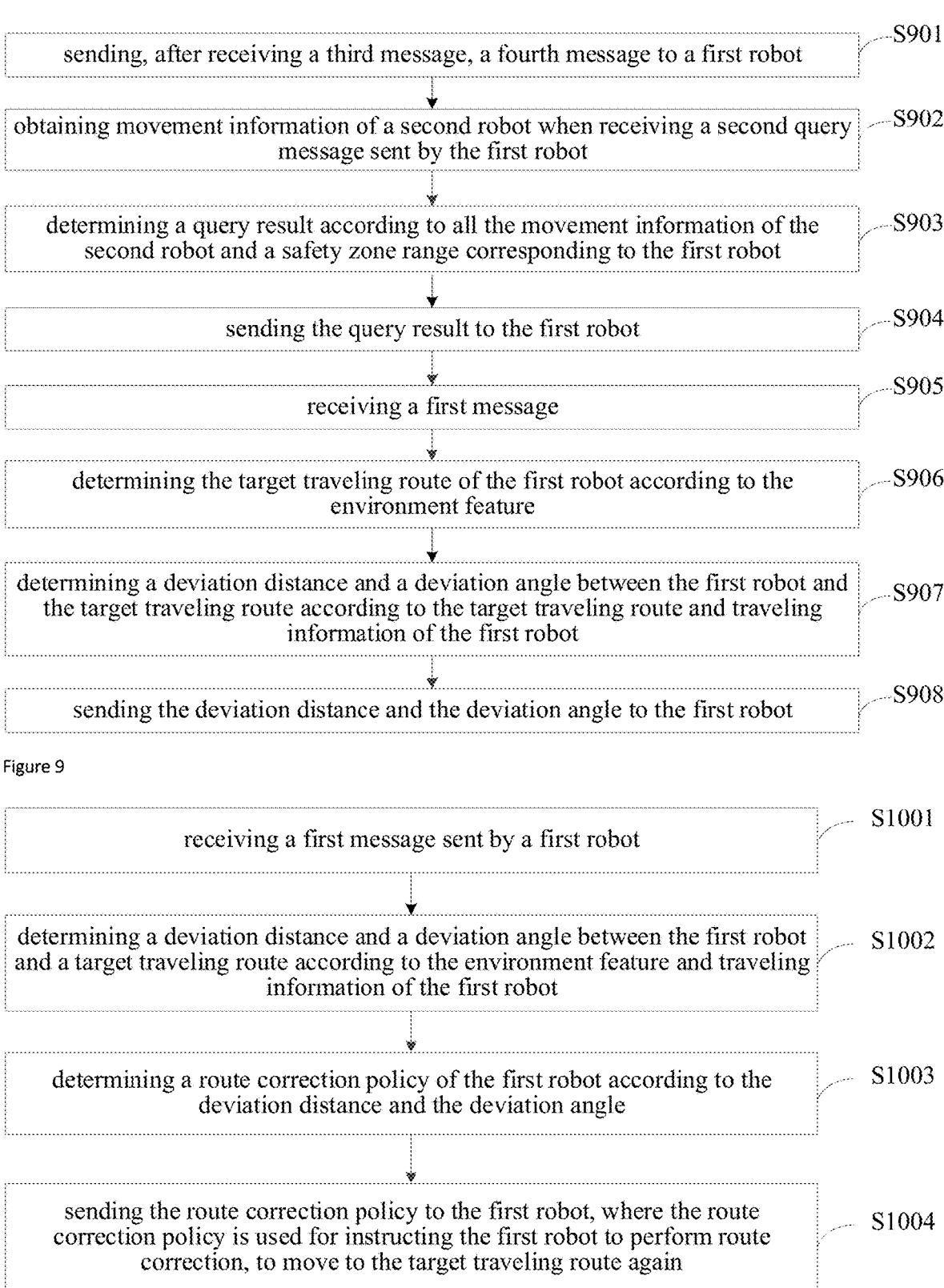

sending, after receiving a third message, a fourth message to a first robot    S901 obtaining movement information of a second robot when receiving a second query message sent by the first robot    S902 determining a query result according to all the movement information of the second robot and a safety zone range corresponding to the first robot    S903 sending the query result to the first robot    S904 receiving a first message    S905 determining the target traveling route of the first robot according to the environment feature    S906 determining a deviation distance and a deviation angle between the first robot and the target traveling route according to the target traveling route and traveling information of the first robot    S907 sending the deviation distance and the deviation angle to the first robot    S908

Figure 9 receiving a first message sent by a first robot    S1001 determining a deviation distance and a deviation angle between the first robot and a target traveling route according to the environment feature and traveling information of the first robot    S1002 determining a route correction policy of the first robot according to the deviation distance and the deviation angle    S1003 sending the route correction policy to the first robot, where the route correction policy is used for instructing the first robot to perform route correction, to move to the target traveling route again    S1004

Figure 10

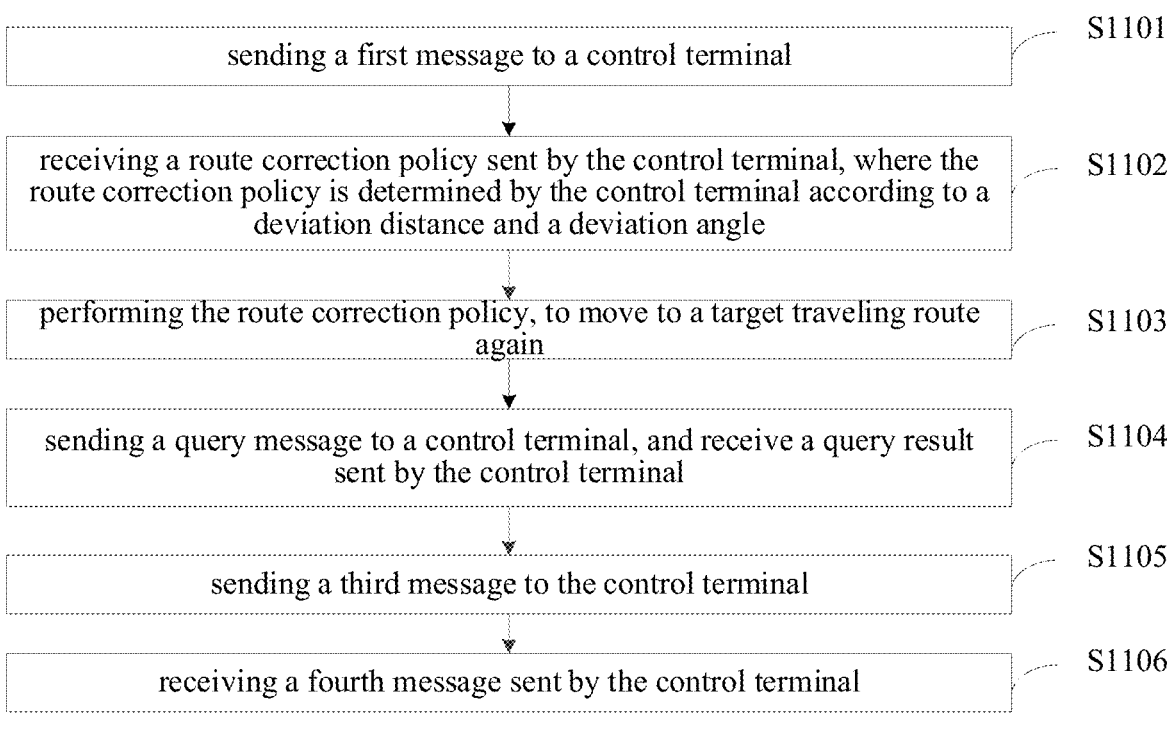

sending a first message to a control terminal    S1101 receiving a route correction policy sent by the control terminal, where the route correction policy is determined by the control terminal according to a deviation distance and a deviation angle    S1102 performing the route correction policy, to move to a target traveling route again    S1103 sending a query message to a control terminal, and receive a query result sent by the control terminal    S1104 sending a third message to the control terminal    S1105 receiving a fourth message sent by the control terminal    S1106

Figure 11

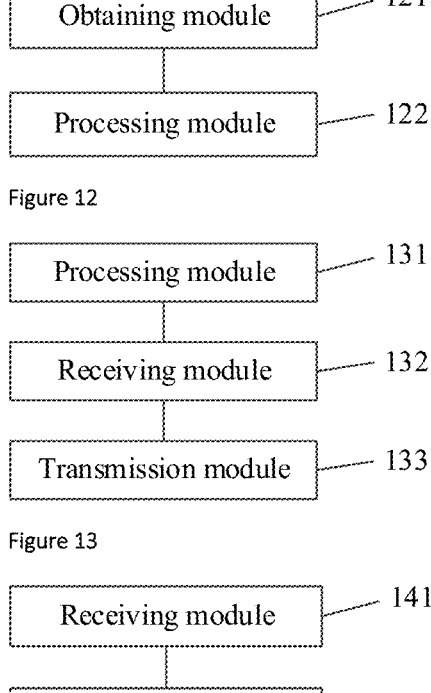

Obtaining module    121

Processing module    122

Figure 12

Processing module    131

Receiving module    132

Transmission module    133

Figure 13

Receiving module    141

Processing module    142

Transmission module    143

Figure 14

ROBOT CONTROL METHOD, ROBOT, AND STORAGE MEDIUM

CROSS-REFERENCES

The present disclosure is a continuation of International Patent Application No. CT/CN2022/120083 filed on Sep. 21, 2022, which claims priority to Chinese Patent Application Ser. No. 202111144801.1, filed on Sep. 28, 2021, which are incorporated herein by reference in their entireties.

TECHNICAL FIELD

The present disclosure relates to the technical field of robots, and in particular to a robot control method, a robot, a control terminal, and a control system.

BACKGROUND OF THE INVENTION

When performing a task, a robot may deviate from a target traveling route for a reason that wheels slip in a movement process or another reason. Then, the robot cannot detect a two-dimensional barcode on the traveling route, and cannot be positioned accurately and continue to perform the task. In the related technology, a worker usually transfers the robot deviating from the route to the target traveling route corresponding to the robot, to correct the traveling route of the robot. However, such a manner is not only labor-consuming, but also time-consuming and inefficient in a processing process.

SUMMARY OF THE INVENTION

The present disclosure provides a robot control method, a robot, a control terminal, and a control system, to enable a robot to automatically perform route correction, thereby improving route correction efficiency of the robot.

According to a first aspect, the present disclosure provides a robot control method, applied to a first robot, where the method includes: obtaining an environment feature around the first robot when the first robot detects no positioning identifier; determining a deviation distance and a deviation angle between the first robot and a target traveling route of the first robot according to the environment feature and traveling information of the first robot; and controlling the first robot to perform route correction according to the deviation distance and the deviation angle, to cause the first robot to move to the target traveling route again.

Optionally, the controlling the first robot to perform route correction according to the deviation distance and the deviation angle includes: determining whether an obstacle exists in a safety zone range corresponding to the first robot; and controlling the first robot to perform route correction according to the deviation distance and the deviation angle if no obstacle exists in the safety zone range.

Optionally, the controlling the first robot to perform route correction according to the deviation distance and the deviation angle includes: determining a first zone range according to the environment feature and the traveling information of the first robot, where the first zone range is a zone in which no obstacle exists around the first robot; determining a second zone range according to the deviation distance and the deviation angle, where the second zone range is a minimum range required for controlling the first robot to perform route correction; and controlling the first robot to perform route correction according to the deviation distance and the deviation angle if the first zone range is greater than or equal to the second zone range.

Optionally, the obstacle includes a second robot; and the determining whether an obstacle exists in a safety zone range corresponding to the first robot includes: sending a first query message to the second robot; receiving movement information sent by the second robot according to the first query message, where the movement information includes a movement route and a movement speed; determining, according to the movement route and the movement speed, whether the second robot travels into the safety zone range in preset duration; and determining, if the second robot does not travel into the safety zone range, that no obstacle exists in the safety zone range corresponding to the first robot.

Optionally, the obstacle includes a second robot; and the determining whether an obstacle exists in a safety zone range corresponding to the first robot includes: sending a second query message to a control terminal; and receiving a query result sent by the control terminal, where the query result is used for indicating whether an obstacle exists in the safety zone range, the query result is determined by the control terminal according to movement information of all second robots, and the movement information includes a movement route and a movement speed.

Optionally, before the controlling the first robot to perform route correction according to the deviation distance and the deviation angle, the method further includes: determining, according to the environment feature and the traveling information of the first robot, a target zone in which the first robot is located; determining a target safety level corresponding to the target zone according to the target zone and a preset correspondence between zones and safety levels; and determining the safety zone range corresponding to the first robot according to the target safety level.

Optionally, the determining a deviation distance and a deviation angle between the first robot and a target traveling route according to the environment feature includes: sending a first message to a control terminal, where the first message includes the environment feature; and receiving the deviation distance and the deviation angle that are between the first robot and the target traveling route that are determined by the control terminal according to the environment feature and the traveling information of the first robot.

Optionally, the determining a deviation distance and a deviation angle between the first robot and a target traveling route according to the environment feature includes: obtaining the traveling information of the first robot; determining the target traveling route according to the environment feature; and determining the deviation distance and the deviation angle between the first robot and the target traveling route according to the target traveling route and the traveling information.

Optionally, the controlling the first robot to move according to the deviation distance and the deviation angle includes: determining, if the deviation distance is greater than or equal to a first preset value and the deviation angle is less than a second preset value, a minimum distance between the first robot and an obstacle around the first robot according to the environment feature; and controlling, if the minimum distance is greater than or equal to a first preset safety distance, the first robot to move in a first preset mode and a second preset mode alternately, where the first preset mode is used for reducing the deviation angle, and the second preset mode is used for reducing the deviation distance.

Optionally, the controlling the first robot to move according to the deviation distance and the deviation angle includes: determining a second zone range according to the environment feature if the deviation distance is greater than or equal to a first preset value and the deviation angle is less than a second preset value, where the second zone range is a zone in which no obstacle exists around the first robot; controlling, if the second zone range is greater than or equal to a third preset value, the first robot to move in a first preset mode, and controlling, after determining that the first robot moves into a first preset range, the first robot to move in the first preset mode and a second preset mode alternately; and controlling, if the second zone range is greater than or equal to a fourth preset value and less than a second preset value, the first robot to move in a first preset mode and a second preset mode alternately, where the first preset mode is used for reducing the deviation angle, and the second preset mode is used for reducing the deviation distance.

Optionally, the controlling the first robot to move according to the deviation distance and the deviation angle includes: determining, if the deviation distance is greater than or equal to a first preset value and the deviation angle is less than a second preset value, a minimum distance between the first robot and an obstacle around the first robot according to the environment feature; and controlling, if the minimum distance is greater than or equal to a first preset safety distance and less than a second preset safety distance, the first robot to move in a first preset mode and a second preset mode alternately, controlling, if the minimum distance is greater than or equal to the second preset safety distance, the first robot to move in the first preset mode, and controlling, if the deviation distance is less than or equal to a fifth preset value, the first robot to move in the first preset mode and the second preset mode alternately, where the first preset mode is used for reducing the deviation angle, and the second preset mode is used for reducing the deviation distance.

Optionally, the controlling the first robot to perform route correction according to the deviation distance and the deviation angle includes: controlling, if the deviation angle is greater than or equal to a second preset value and the deviation distance is less than a first preset value, the first robot to move in a first preset mode, and controlling, after the first robot moves into a second preset range, the first robot to move in the first preset mode and a second preset mode alternately, where the first preset mode is used for reducing the deviation angle, and the second preset mode is used for reducing the deviation distance.

Optionally, the controlling the first robot to perform route correction according to the deviation distance and the deviation angle includes: controlling, if the deviation position is greater than or equal to a first preset value and the deviation angle is greater than or equal to a second preset value, the first robot to move in a second preset mode and a first preset mode alternately, where the first preset mode is used for reducing the deviation angle, and the second preset mode is used for reducing the deviation distance.

Optionally, before the determining a deviation distance and a deviation angle between the first robot and a target traveling route according to the environment feature, the method further includes: determining the target traveling route of the first robot, where the target traveling route includes a plurality of positioning identifiers.

Optionally, the determining the target traveling route of the first robot includes: obtaining at least one feature image corresponding to an environment around the first robot; determining, according to the at least one feature image and a historical traveling route of the first robot, positions of at least two rack legs in an aisle in which the first robot is located; and determining the target traveling route of the first robot according to the positions of the at least two rack legs.

Optionally, the method further includes: sending a third message to the control terminal, where the third message is used for instructing the first robot to move to the target traveling route again; and receiving a fourth message sent by the control terminal, where the fourth message is sent after the control terminal receives the third message, the fourth message includes a target task, and the fourth message is used for instructing the first robot to perform the target task.

Optionally, the traveling information includes at least two of the following information: a movement speed, a movement time, and a historical traveling track.

According to a second aspect, the present disclosure provides a robot control method, applied to a control terminal, where the method includes: sending, after receiving a third message, a fourth message to a first robot, where the third message is sent by the first robot after moving to a target traveling route again, the fourth message includes a target task, and the fourth message is used for instructing the first robot to perform the target task.

Optionally, the method further includes: obtaining movement information of a second robot when receiving a second query message sent by the first robot, where the movement information includes a movement route and a movement speed; determining a query result according to the movement information of all second robots and a safety zone range corresponding to the first robot, where the query result is used for indicating whether an obstacle exists in the safety zone range; and sending the query result to the first robot.

Optionally, the method further includes: receiving a first message, where the first message is sent when the first robot detects no positioning identifier, and the first message includes an environment feature around the first robot; determining the target traveling route of the first robot according to the environment feature; determining a deviation distance and a deviation angle between the first robot and the target traveling route according to the target traveling route and traveling information of the first robot; and sending the deviation distance and the deviation angle to the first robot.

Optionally, the method further includes: receiving a first message, where the first message is sent when the first robot detects no positioning identifier, and the first message includes an environment feature around the first robot; determining a deviation distance and a deviation angle between the first robot and the target traveling route according to the environment feature, traveling information of the first robot, and the stored target traveling route of the first robot; and sending the deviation distance and the deviation angle to the first robot.

Optionally, the traveling information includes at least two of the following information: a movement speed, a movement time, and a historical traveling track.

According to a third aspect, the present disclosure provides a robot control method, applied to a control terminal, where the method includes: receiving a first message sent by a first robot, where the first message is sent after the first robot detects no positioning identifier, and the first message includes an environment feature around the first robot; determining a deviation distance and a deviation angle between the first robot and a target traveling route according to the environment feature and traveling information of the first robot; determining a route correction policy of the first robot according to the deviation distance and the deviation angle; and sending the route correction policy to the first robot, where the route correction policy is used for instructing the first robot to perform route correction, to move to the target traveling route again.

Optionally, the determining a route correction policy of the first robot according to the deviation distance and the deviation angle includes: obtaining movement information of a second robot when receiving a query message sent by the first robot, where the movement information includes a movement route and a movement speed; determining a query result according to the movement information of the second robot and a safety zone range corresponding to the first robot, where the query result is used for indicating whether an obstacle exists in the safety zone range; and sending the query result to the first robot.

Optionally, before the determining a query result according to the movement information of the second robot and a safety zone range corresponding to the first robot, the method further includes: determining, according to the deviation distance and the deviation angle, a target zone in which the first robot is located; determining a target safety level corresponding to the target zone according to the target zone and a preset correspondence between zones and safety levels; and determining the safety zone range corresponding to the first robot according to the target safety level.

Optionally, the controlling the first robot to move according to the deviation distance and the deviation angle includes: determining, if the deviation distance is greater than or equal to a first preset value and the deviation angle is less than a second preset value, a minimum distance between the first robot and an obstacle around the first robot according to the environment feature; and controlling, if the minimum distance is greater than or equal to a first preset safety distance, the first robot to move in a first preset mode and a second preset mode alternately, where the first preset mode is used for reducing the deviation angle, and the second preset mode is used for reducing the deviation distance.

Optionally, the controlling the first robot to move according to the deviation distance and the deviation angle includes: determining a second zone range according to the environment feature if the deviation distance is greater than or equal to a first preset value and the deviation angle is less than a second preset value, where the second zone range is a zone in which no obstacle exists around the first robot; controlling, if the second zone range is greater than or equal to a third preset value, the first robot to move in a first preset mode, and controlling, after determining that the first robot moves into a first preset range, the first robot to move in the first preset mode and a second preset mode alternately; and controlling, if the second zone range is greater than or equal to a fourth preset value and less than a second preset value, the first robot to move in a first preset mode and a second preset mode alternately, where the first preset mode is used for reducing the deviation angle, and the second preset mode is used for reducing the deviation distance.

Optionally, the controlling the first robot to move according to the deviation distance and the deviation angle includes: determining, if the deviation distance is greater than or equal to a first preset value and the deviation angle is less than a second preset value, a minimum distance between the first robot and an obstacle around the first robot according to the environment feature; and controlling, if the minimum distance is greater than or equal to a first preset safety distance and less than a second preset safety distance, the first robot to move in a first preset mode and a second preset mode alternately, controlling, if the minimum distance is greater than or equal to the second preset safety distance, the first robot to move in the first preset mode, and controlling, if the deviation distance is less than or equal to a fifth preset value, the first robot to move in the first preset mode and the second preset mode alternately, where the first preset mode is used for reducing the deviation angle, and the second preset mode is used for reducing the deviation distance.

Optionally, the determining a route correction policy of the first robot according to the deviation distance and the deviation angle includes: controlling, if the deviation angle is greater than or equal to a second preset value and the deviation distance is less than a first preset value, the first robot to move in a first preset mode, and controlling, after the first robot moves into a second preset range, the first robot to move in the first preset mode and a second preset mode alternately, where the first preset mode is used for reducing the deviation angle, and the second preset mode is used for reducing the deviation distance.

Optionally, the determining a route correction policy of the first robot according to the deviation distance and the deviation angle includes: controlling, if the deviation position is greater than or equal to a first preset value and the deviation angle is greater than or equal to a second preset value, the first robot to move in a second preset mode and a first preset mode alternately, where the first preset mode is used for reducing the deviation angle, and the second preset mode is used for reducing the deviation distance.

Optionally, the method further includes: determining whether a third robot exists in a safety zone range corresponding to the first robot in preset duration; and controlling, if the third robot exists, the third robot to be forbidden from traveling into the safety zone range.

Optionally, the determining a deviation distance and a deviation angle between the first robot and a target traveling route according to the environment feature and traveling information of the first robot includes: determining the target traveling route according to the environment feature; and determining the deviation distance and the deviation angle between the first robot and the target traveling route according to the target traveling route and the traveling information of the first robot.

Optionally, the determining a deviation distance and a deviation angle between the first robot and a target traveling route according to the environment feature and traveling information of the first robot includes: determining a deviation distance and a deviation angle between the first robot and the target traveling route according to the environment feature, traveling information of the first robot, and the pre-stored target traveling route of the first robot.

Optionally, the method further includes: sending, after receiving a third message, a fourth message to a first robot, where the third message is sent by the first robot after moving to a target traveling route again, the fourth message includes a target task, and the fourth message is used for instructing the first robot to perform the target task.

Optionally, the traveling information includes at least two of the following information: a movement speed, a movement time, and a historical traveling track.

According to a fourth aspect, the present disclosure provides a robot control method, applied to a first robot, where the method includes: sending a first message to a control terminal, where the first message is sent after the first robot detects no positioning identifier, and the first message includes an environment feature around the first robot; receiving a route correction policy sent by the control terminal, where the route correction policy is determined by the control terminal according to a deviation distance and a deviation angle; and performing the route correction policy, to move to a target traveling route again.

Optionally, the method further includes: sending a query message to a control terminal; and receiving a query result sent by the control terminal, where the query result is used for indicating whether an obstacle exists in a safety zone range corresponding to the first robot, the query result is determined by the control terminal according to movement information of all second robots, and the movement information includes a movement route and a movement speed.

Optionally, the method further includes: sending a third message to the control terminal, where the third message is used for instructing the first robot to move to the target traveling route again; and receiving a fourth message sent by the control terminal, where the fourth message is sent after the control terminal receives the third message, the fourth message includes a target task, and the fourth message is used for instructing the first robot to perform the target task.

According to a fifth aspect, the present disclosure provides a robot control apparatus, where the apparatus includes:

an obtaining module, configured to obtain an environment feature around the first robot when a first robot detects no positioning identifier; and a processing module, configured to determine a deviation distance and a deviation angle between the first robot and a target traveling route of the first robot according to the environment feature and traveling information of the first robot.

The processing module is further configured to control the first robot to perform route correction according to the deviation distance and the deviation angle, to cause the first robot to move to the target traveling route again.

Optionally, the processing module is specifically configured to determine whether an obstacle exists in a safety zone range corresponding to the first robot; and control the first robot to perform route correction according to the deviation distance and the deviation angle if no obstacle exists in the safety zone range.

Optionally, the processing module is specifically configured to determine a first zone range according to the environment feature and the traveling information of the first robot, where the first zone range is a zone in which no obstacle exists around the first robot; determine a second zone range according to the deviation distance and the deviation angle, where the second zone range is a minimum range required for controlling the first robot to perform route correction; and control the first robot to perform route correction according to the deviation distance and the deviation angle if the first zone range is greater than or equal to the second zone range.

Optionally, the obstacle includes a second robot, and that the processing module is specifically configured to determine whether an obstacle exists in a safety zone range corresponding to the first robot includes: sending a first query message to the second robot; receive movement information sent by the second robot according to the first query message, where the movement information includes a movement route and a movement speed; determine, according to the movement route and the movement speed, whether the second robot travels into the safety zone range in preset duration; and determine, if the second robot does not travel into the safety zone range, that no obstacle exists in the safety zone range corresponding to the first robot.

Optionally, the obstacle includes a second robot, and the processing module is specifically configured to send a second query message to a control terminal; and receive a query result sent by the control terminal, where the query result is used for indicating whether an obstacle exists in the safety zone range, the query result is determined by the control terminal according to movement information of all second robots, and the movement information includes a movement route and a movement speed.

Optionally, the processing module is further configured to determine, according to the environment feature and the traveling information of the first robot, a target zone in which the first robot is located; determine a target safety level corresponding to the target zone according to the target zone and a preset correspondence between zones and safety levels; and determine the safety zone range corresponding to the first robot according to the target safety level.

Optionally, the processing module is specifically configured to send a first message to a control terminal, where the first message includes the environment feature; and receive the deviation distance and the deviation angle that are between the first robot and the target traveling route that are determined by the control terminal according to the environment feature and the traveling information of the first robot.

Optionally, the processing module is specifically configured to obtain the traveling information of the first robot; determine the target traveling route according to the environment feature; and determine the deviation distance and the deviation angle between the first robot and the target traveling route according to the target traveling route and the traveling information.

Optionally, the processing module is specifically configured to determine, if the deviation distance is greater than or equal to a first preset value and the deviation angle is less than a second preset value, a minimum distance between the first robot and an obstacle around the first robot according to the environment feature; and control, if the minimum distance is greater than or equal to a first preset safety distance, the first robot to move in a first preset mode and a second preset mode alternately, where the first preset mode is used for reducing the deviation angle, and the second preset mode is used for reducing the deviation distance.

Optionally, the processing module is specifically configured to determine a second zone range according to the environment feature if the deviation distance is greater than or equal to a first preset value and the deviation angle is less than a second preset value, where the second zone range is a zone in which no obstacle exists around the first robot; control, if the second zone range is greater than or equal to a third preset value, the first robot to move in a first preset mode, and controlling, after determining that the first robot moves into a first preset range, the first robot to move in the first preset mode and a second preset mode alternately; and control, if the second zone range is greater than or equal to a fourth preset value and less than a second preset value, the first robot to move in a first preset mode and a second preset mode alternately, where the first preset mode is used for reducing the deviation angle, and the second preset mode is used for reducing the deviation distance.

Optionally, the processing module is specifically configured to determine, if the deviation distance is greater than or equal to a first preset value and the deviation angle is less than a second preset value, a minimum distance between the first robot and an obstacle around the first robot according to the environment feature; and control, if the minimum distance is greater than or equal to a first preset safety distance and less than a second preset safety distance, the first robot to move in a first preset mode and a second preset mode alternately, controlling, if the minimum distance is greater than or equal to the second preset safety distance, the first robot to move in the first preset mode, and controlling, if the deviation distance is less than or equal to a fifth preset value, the first robot to move in the first preset mode and the second preset mode alternately, where the first preset mode is used for reducing the deviation angle, and the second preset mode is used for reducing the deviation distance.

Optionally, the processing module is specifically configured to control, if the deviation angle is greater than or equal to a second preset value and the deviation distance is less than a first preset value, the first robot to move in a first preset mode, and control, after the first robot moves into a second preset range, the first robot to move in the first preset mode and a second preset mode alternately, where the first preset mode is used for reducing the deviation angle, and the second preset mode is used for reducing the deviation distance.

Optionally, the processing module is specifically configured to control, if the deviation position is greater than or equal to a first preset value and the deviation angle is greater than or equal to a second preset value, the first robot to move in a second preset mode and a first preset mode alternately, where the first preset mode is used for reducing the deviation angle, and the second preset mode is used for reducing the deviation distance.

Optionally, the processing module is further configured to determine the target traveling route of the first robot, where the target traveling route includes a plurality of positioning identifiers.

Optionally, the processing module is specifically configured to obtain at least one feature image corresponding to an environment around the robot; determine, according to the at least one feature image and a historical traveling route of the first robot, positions of at least two rack legs in an aisle in which the first robot is located; and determine the target traveling route of the first robot according to the positions of the at least two rack legs.

Optionally, the processing module is further configured to send a third message to the control terminal, where the third message is used for instructing the first robot to move to the target traveling route again; and receive a fourth message sent by the control terminal, where the fourth message is sent after the control terminal receives the third message, the fourth message includes a target task, and the fourth message is used for instructing the first robot to perform the target task.

Optionally, the traveling information includes at least two of the following information: a movement speed, a movement time, and a historical traveling track.

The robot control apparatus may perform the foregoing robot control method. For its content and effect, reference may be made to the method embodiment part, and details are not described again.

According to a sixth aspect, the present disclosure provides a robot control apparatus, where the apparatus includes:

a processing module, configured to send, after receiving a third message, a fourth message to a first robot, where the third message is sent by the first robot after moving to a target traveling route again, the fourth message includes a target task, and the fourth message is used for instructing the first robot to perform the target task.

Optionally, the processing module is specifically configured to obtain movement information of a second robot when receiving a second query message sent by the first robot, where the movement information includes a movement route and a movement speed; determine a query result according to all the movement information of the second robot and a safety zone range corresponding to the first robot, where the query result is used for indicating whether an obstacle exists in the safety zone range; and send the query result to the first robot.

Optionally, the method further includes:

a receiving module, configured to receive a first message, where the first message is sent when the first robot detects no positioning identifier, and the first message includes an environment feature around the first robot; and the processing module is further configured to determine the target traveling route of the first robot according to the environment feature; and determine the deviation distance and the deviation angle between the first robot and the target traveling route according to the target traveling route and the traveling information of the first robot.

a sending module, configured to send the deviation distance and the deviation angle to the first robot.

Optionally, the receiving module is further configured to receive a first message, where the first message is sent when the first robot detects no positioning identifier, and the first message includes an environment feature around the first robot.

The processing module is further configured to determine a deviation distance and a deviation angle between the first robot and the target traveling route according to the environment feature, traveling information of the first robot, and the stored target traveling route of the first robot.

The sending module is further configured to send the deviation distance and the deviation angle to the first robot.

Optionally, the traveling information includes at least two of the following information: a movement speed, a movement time, and a historical traveling track.

The robot control apparatus may perform the foregoing robot control method. For its content and effect, reference may be made to the method embodiment part, and details are not described again.

According to a seventh aspect, the present disclosure provides a robot control apparatus, where the apparatus includes:

a receiving module, configured to receive a first message sent by a first robot, where the first message is sent after the first robot detects no positioning identifier, and the first message includes an environment feature around the first robot;

a processing module, configured to determine a deviation distance and a deviation angle between the first robot and a target traveling route according to the environment feature and traveling information of the first robot, where the processing module is further configured to determine a route correction policy of the first robot according to the deviation distance and the deviation angle; and a sending module, configured to send the route correction policy to the first robot, where the route correction policy is used for instructing the first robot to perform route correction, to move to the target traveling route again.

Optionally, the processing module is specifically configured to obtain movement information of a second robot when receiving a query message sent by the first robot, where the movement information includes a movement route and a movement speed; determine a query result according to the movement information of the second robot and a safety zone range corresponding to the first robot, where the query result is used for indicating whether an obstacle exists in the safety zone range; and send the query result to the first robot.

Optionally, the processing module is further configured to determine, according to the deviation distance and the deviation angle, a target zone in which the first robot is located; determine a target safety level corresponding to the target zone according to the target zone and a preset correspondence between zones and safety levels; and determine the safety zone range corresponding to the first robot according to the target safety level.

Optionally, the processing module is specifically configured to determine, if the deviation distance is greater than or equal to a first preset value and the deviation angle is less than a second preset value, a minimum distance between the first robot and an obstacle around the first robot according to the environment feature; and control, if the minimum distance is greater than or equal to a first preset safety distance, the first robot to move in a first preset mode and a second preset mode alternately, where the first preset mode is used for reducing the deviation angle, and the second preset mode is used for reducing the deviation distance.

Optionally, the processing module is specifically configured to determine a second zone range according to the environment feature if the deviation distance is greater than or equal to a first preset value and the deviation angle is less than a second preset value, where the second zone range is a zone in which no obstacle exists around the first robot; control, if the second zone range is greater than or equal to a third preset value, the first robot to move in a first preset mode, and controlling, after determining that the first robot moves into a first preset range, the first robot to move in the first preset mode and a second preset mode alternately; and control, if the second zone range is greater than or equal to a fourth preset value and less than a second preset value, the first robot to move in a first preset mode and a second preset mode alternately, where the first preset mode is used for reducing the deviation angle, and the second preset mode is used for reducing the deviation distance.

Optionally, the processing module is specifically configured to determine, if the deviation distance is greater than or equal to a first preset value and the deviation angle is less than a second preset value, a minimum distance between the first robot and an obstacle around the first robot according to the environment feature; and control, if the minimum distance is greater than or equal to a first preset safety distance and less than a second preset safety distance, the first robot to move in a first preset mode and a second preset mode alternately, controlling, if the minimum distance is greater than or equal to the second preset safety distance, the first robot to move in the first preset mode, and controlling, if the deviation distance is less than or equal to a fifth preset value, the first robot to move in the first preset mode and the second preset mode alternately, where the first preset mode is used for reducing the deviation angle, and the second preset mode is used for reducing the deviation distance.

Optionally, the processing module is specifically configured to control, if the deviation angle is greater than or equal to a second preset value and the deviation distance is less than a first preset value, the first robot to move in a first preset mode, and control, after the first robot moves into a second preset range, the first robot to move in the first preset mode and a second preset mode alternately, where the first preset mode is used for reducing the deviation angle, and the second preset mode is used for reducing the deviation distance.

Optionally, the processing module is specifically configured to control, if the deviation position is greater than or equal to a first preset value and the deviation angle is greater than or equal to a second preset value, the first robot to move in a second preset mode and a first preset mode alternately, where the first preset mode is used for reducing the deviation angle, and the second preset mode is used for reducing the deviation distance.

Optionally, the processing module is further configured to determine whether a third robot exists in a safety zone range corresponding to the first robot in preset duration; and control, if the third robot exists, the third robot to be forbidden from traveling into the safety zone range.

Optionally, the processing module is specifically configured to determine the target traveling route according to the environment feature; and determine the deviation distance and the deviation angle between the first robot and the target traveling route according to the target traveling route and the traveling information of the first robot.

Optionally, the processing module is specifically configured to determine a deviation distance and a deviation angle between the first robot and the target traveling route according to the environment feature, traveling information of the first robot, and the pre-stored target traveling route of the first robot.

Optionally, the processing module is further configured to send, after receiving a third message, a fourth message to a first robot, where the third message is sent by the first robot after moving to a target traveling route again, the fourth message includes a target task, and the fourth message is used for instructing the first robot to perform the target task.

Optionally, the traveling information includes at least two of the following information: a movement speed, a movement time, and a historical traveling track.

The robot control apparatus may perform the foregoing robot control method. For its content and effect, reference may be made to the method embodiment part, and details are not described again.

According to an eighth aspect, the present disclosure provides a robot control apparatus, where the apparatus includes:

a sending module, configured to send a first message to a control terminal, where the first message is sent after the first robot detects no positioning identifier, and the first message includes an environment feature around the first robot;

a receiving module, configured to receive a route correction policy sent by the control terminal, where the route correction policy is determined by the control terminal according to a deviation distance and a deviation angle; and a processing module, configured to perform the route correction policy, to move to a target traveling route again.

Optionally, the sending module is further configured to send a query message to a control terminal; and the receiving module is further configured to receive a query result sent by the control terminal, where the query result is used for indicating whether an obstacle exists in a safety zone range corresponding to the first robot, the query result is determined by the control terminal according to movement information of all second robots, and the movement information includes a movement route and a movement speed.

Optionally, the sending module is further configured to send a third message to the control terminal, where the third message is used for instructing the first robot to move to the target traveling route again; and the receiving module is further configured to receive a fourth message sent by the control terminal, where the fourth message is sent after the control terminal receives the third message, the fourth message includes a target task, and the fourth message is used for instructing the first robot to perform the target task.

According to a ninth aspect, the present disclosure provides a robot, including: at least one processor; and a memory communicatively connected to the at least one processor, where the memory stores instructions executable by the at least one processor, and the instructions are executed by the at least one processor, to cause the at least one processor to perform the method according to the first aspect and the optional manners of the first aspect.

According to a tenth aspect, the present disclosure provides a control terminal, including: at least one processor; and a memory communicatively connected to the at least one processor, where the memory stores instructions executable by the at least one processor, and the instructions are executed by the at least one processor, to cause the at least one processor to perform the method according to the second aspect and the optional manners of the second aspect.

According to an eleventh aspect, the present disclosure provides a robot, including: at least one processor; and a memory communicatively connected to the at least one processor, where the memory stores instructions executable by the at least one processor, and the instructions are executed by the at least one processor, to cause the at least one processor to perform the method according to the fourth aspect and the optional manners of the fourth aspect.

According to a twelfth aspect, the present disclosure provides a control terminal, including: at least one processor; and a memory communicatively connected to the at least one processor, where the memory stores instructions executable by the at least one processor, and the instructions are executed by the at least one processor, to cause the at least one processor to perform the method according to the third aspect and the optional manners of the third aspect.

According to a thirteenth aspect, the present disclosure provides a robot control system, including the robot provided in the ninth aspect and the control terminal provided in the tenth aspect.

According to a fourteenth aspect, the present disclosure provides a robot control system, including the robot provided in the eleventh aspect and the control terminal provided in the twelfth aspect.

According to a fifteenth aspect, the present disclosure provides a computer-readable storage medium. The computer-readable storage medium stores computer executable instructions, and when being executed by a processor, the computer executable instructions are used for implementing the method according to the first aspect or the optional manners of the first aspect, the method according to the second aspect or the optional manners of the second aspect, the method according to the third aspect or the optional manners of the third aspect, or the method according to the fourth aspect or the optional manners of the fourth aspect.

According to a sixteenth aspect, the present disclosure provides a computer program product, including a computer program/instruction. The computer program/instruction, when being executed by a processor, implements the method according to the first aspect or the optional manners of the first aspect, the method according to the second aspect or the optional manners of the second aspect, the method according to the third aspect or the optional manners of the third aspect, or the method according to the fourth aspect or the optional manners of the fourth aspect.

In the robot control method, the robot, the control terminal, and the control system provided in the present disclosure, by obtaining an environment feature around the first robot when the first robot detects no positioning identifier; determining a deviation distance and a deviation angle between the first robot and a target traveling route of the first robot according to the environment feature and traveling information of the first robot; and controlling the first robot to perform route correction according to the deviation distance and the deviation angle, to cause the first robot to move to the target traveling route again, when the first robot deviates, the first robot can be controlled to automatically move to the target traveling route, to correct the traveling route of the first robot and recover to a normal operation status; and human intervention can be reduced, to reduce manpower costs, save time, and improve route correction efficiency of the robot.

BRIEF DESCRIPTION OF DRAWINGS

FIG. 1 is a schematic diagram of an application scenario of a robot control method according to the present disclosure;

FIG. 2 is a schematic flowchart of a robot control method according to the present disclosure;

FIG. 3 is a schematic flowchart of another robot control method according to the present disclosure;

FIG. 4 is a side view of a rack according to the present disclosure;

FIG. 5 is a schematic diagram of a robot deviating from a target traveling route according to the present disclosure;

FIG. 6 is another schematic diagram of a robot deviating from a target traveling route according to the present disclosure;

FIG. 7 is still another schematic diagram of a robot deviating from a target traveling route according to the present disclosure;

FIG. 8 is a schematic flowchart of still another robot control method according to the present disclosure;

FIG. 9 is a schematic flowchart of yet another robot control method according to the present disclosure;

FIG. 10 is a schematic flowchart of yet another robot control method according to the present disclosure;

FIG. 11 is a schematic flowchart of yet another robot control method according to the present disclosure;

FIG. 12 is a schematic structural diagram of a robot control apparatus according to the present disclosure;

FIG. 13 is a schematic structural diagram of another robot control apparatus according to the present disclosure;

FIG. 14 is a schematic structural diagram of still another robot control apparatus according to the present disclosure;

Figure 15:
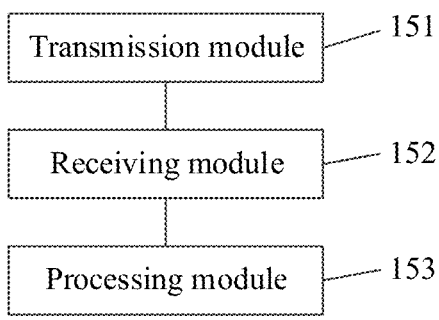
FIG. 15 is a schematic structural diagram of yet another robot control apparatus according to the present disclosure.

Specific embodiments of the present disclosure are shown by the above drawings, and more detailed description will be given below. These drawings and text description are not for limiting the scope of the concept of the present disclosure in any way, but for illustrating the concept of the present disclosure for those skilled in the art by referring to specific embodiments.

DETAILED DESCRIPTION

Exemplary embodiments will be described here in detail, and examples thereof are represented in the accompanying drawings. When the following description relates to the accompanying drawings, unless otherwise indicated, the same numbers in different accompanying drawings represent the same or similar elements. The implementations described in the following exemplary embodiments do not represent all implementations consistent with the disclosure. On the contrary, they are merely examples of apparatuses and methods consistent with some aspects of the disclosure as detailed in the appended claims.

When performing a task, a robot may deviate from a target traveling route for a reason that wheels slip in a movement process or another reason. Then, the robot cannot detect a two-dimensional barcode on the traveling route, and cannot accurately perform positioning and continue to perform the task. In the related technology, a worker needs to transfer a robot onto a target traveling route, manually correct a position of the robot, and restart a task. Such a solution is labor-consuming and time-consuming, and inefficient in route correction. Particularly, as shown in FIG. 1, when a plurality of robots exist, because a faulty robot takes a long time to recover, the plurality of robots may come to a standstill and crowd in an aisle.

When a robot deviates from a target traveling route, if the robot is enabled to automatically perform route correction according to a deviation status of the robot, find the target traveling route again, and recover to a normal operation status to continue to perform a corresponding task, route correction efficiency can be effectively improved, to save manpower costs.

FIG. 2 is a schematic flowchart of a robot control method according to the present disclosure. The method is applied to a first robot. As shown in FIG. 2, the method includes the following operations:

In block S201: obtaining an environment feature around the first robot when the first robot detects no positioning identifier.

The positioning identifier is used to guide the first robot to travel according to a specified route. For example, the positioning identifier is a two-dimensional barcode or a positioning point.

Optionally, the environment feature around the first robot is obtained through a laser radar or a depth camera.

For example, one laser radar may be mounted on each of any opposite sides of the first robot, to capture all environment feature around the first robot. Specifically, a laser radar may be mounted on each of front and rear sides or left and right sides of the first robot; or a laser radar may be mounted in each of any opposite corners of the first robot, for example, left front and right rear corners or right front and left rear corners.

Alternatively, a sensor for acquiring the environment feature may be arranged at the top of the first robot and toward the periphery, to capture the environment feature around the first robot. For example, a plurality of sensors are arranged at the top of the robot, and detection ranges of the plurality of sensors can collaborate with each other, form omnidirectional detection, and cover a zone around the first robot, to capture the environment feature around the first robot. Alternatively, one rotatable sensor may be arranged, to form an omnidirectional detection range in a rotation manner.

The environment feature includes information about an environment in which the first robot is located. For example, the environment feature may include a rack position, a rack identifier, and rack goods loading information; may alternatively include position information of another robot around the first robot, and a goods loading status of another robot around the first robot; and may alternatively include position information of a person around the first robot.

In block S202: determining a deviation distance and a deviation angle between the first robot and a target traveling route of the first robot according to the environment feature and traveling information of the first robot.

The target traveling route is a correct traveling route corresponding to the task performed by the first robot.

The deviation distance is a separation distance between a current position of the first robot and the target traveling route.

The deviation angle is an angle between a central axis of the first robot and the target traveling route, an angle between a traveling direction of the first robot and the target traveling route, or an angle between a connection line and the target traveling route, where the connection line is a line between a current position of the first robot and an initial position corresponding to a case that the first robot detects no positioning identifier.

Optionally, the traveling information includes at least two of the following information: a movement speed, a movement time, and a historical traveling track.

The movement speed may be a speed of the first robot, which can indicate not only a t magnitude of the first robot's traveling speed, but also a traveling direction of the first robot. For example, the movement speed may be a speed of the first robot at any moment in a movement process, or may be an average speed.

The time may be duration corresponding to any traveling stage of the first robot. For example, the time may be total duration in which the first robot moves from beginning to the current position; may alternatively be total duration in which the first robot moves from a moment at which no positioning identifier is identified to the current position; and may alternatively include both total duration in which the first robot moves from beginning to the current position and total duration in which the first robot moves from a moment at which no positioning identifier is identified to the current position.

In block S203: controlling the first robot to perform route correction according to the deviation distance and the deviation angle, to cause the first robot to move to the target traveling route again.

Specifically, different recovery policies may be determined according to different statuses corresponding to the deviation distance and the deviation angle, and the first robot is controlled to move in different manners and move to the target traveling route again, to complete route correction.

In this embodiment of the present disclosure, by obtaining an environment feature around the first robot when the first robot detects no positioning identifier; determining a deviation distance and a deviation angle between the first robot and a target traveling route of the first robot according to the environment feature and traveling information of the first robot; and controlling the first robot to perform route correction according to the deviation distance and the deviation angle, to cause the first robot to move to the target traveling route again, when the first robot deviates, the first robot can be controlled to automatically move to the target traveling route, to correct the traveling route of the first robot and recover to a normal operation status; and human intervention can be reduced, to reduce manpower costs, save time, and improve correction efficiency.

FIG. 3 is a schematic flowchart of another robot control method according to the present disclosure. The method is applied to a first robot. As shown in FIG. 3, the method includes the following operations:

In block S301: obtaining an environment feature around the first robot when the first robot detects no positioning identifier.

Operation S301 has the same technical feature as that of operation S201. For specific descriptions, reference may be made to operation S201. Details are not described herein.

Optionally, before operation S302, the method further includes: determining the target traveling route of the first robot.

The target traveling route includes a plurality of positioning identifiers. For example, the positioning identifier may be an identifier such as a two-dimensional barcode or a positioning point.

In a possible implementation, the determining the target traveling route of the first robot includes: obtaining at least one feature image corresponding to an environment around the first robot; determining, according to the at least one feature image and a historical traveling route of the first robot, positions of at least two rack legs in an aisle in which the first robot is located; and determining the target traveling route of the first robot according to the positions of the at least two rack legs.

For example, at least one laser point cloud map is captured through a laser radar mounted on the body of the robot, then feature points corresponding to rack legs in the aisle in which the first robot is located are extracted from the captured laser point cloud map with reference to the historical traveling route of the first robot, positions of the rack legs are determined, and the target traveling route of the first robot is further determined according to at least one group of corresponding rack legs.

That the target traveling route of the first robot is further determined according to at least one group of corresponding rack legs may be: determining the target traveling route according to relative positions of the corresponding rack legs.

For example, when the target traveling route is located in the middle of the aisle, a route passing through a midpoint of a connection line between two corresponding rack legs and perpendicular to the connection line may be determined as the target traveling route. When a plurality of groups of corresponding rack legs are determined, a midpoint of a connection line between any two corresponding rack legs may be determined, and a connection line between a plurality of midpoints is determined as the target traveling route.

That the target traveling route of the first robot is determined according to at least one group of corresponding rack legs may alternatively be: determining a boundary of the rack according to positions at least one group of corresponding rack legs; and determining the target traveling route according to a distance from the first robot to the boundary of the rack.

In another possible implementation, the determining the target traveling route of the first robot includes: obtaining at least one feature image corresponding to an environment around the first robot; determining the target traveling route of the first robot according to at least one environment feature included in the at least one feature image and a preset correspondence between traveling routes and environment features.

The environment feature may include an identifier of the rack, a position identifier, and the like.

For example, at least one laser point cloud map is captured through a laser radar mounted on the body of the robot, then feature information of the rack included in the laser point cloud map is determined, a traveling route corresponding to the rack included in the laser point cloud map is determined according to a preset correspondence between traveling routes and environment features, and the traveling route is determined as the target traveling route of the first robot. The preset correspondence between traveling routes and environment features may be specifically a correspondence between two-dimensional barcodes in traveling routes and racks.

In block S302: determining a deviation distance and a deviation angle between the first robot and a target traveling route of the first robot according to the environment feature and traveling information of the first robot.

In a possible implementation, the determining a deviation distance and a deviation angle between the first robot and a target traveling route according to the environment feature and traveling information of the first robot includes: sending a first message to a control terminal, where the first message includes the environment feature; and receiving the deviation distance and the deviation angle that are between the first robot and the target traveling route, where the deviation distance and the deviation angle are determined by the control terminal according to the environment feature and the traveling information of the first robot.

Through the method, the first robot can obtain a deviation distance and a deviation angle between the first robot and the target traveling route without excessive operations, which can increase the route correction speed of the first robot.

In a possible implementation, the determining a deviation distance and a deviation angle between the first robot and a target traveling route according to the environment feature and traveling information of the first robot includes: obtaining the traveling information of the first robot; determining the target traveling route according to the environment feature; and determining the deviation distance and the deviation angle between the first robot and the target traveling route according to the target traveling route and the traveling information.

Specifically, the traveling information may include a movement speed and a movement time of the first robot; or may include historical traveling information of the first robot. Optionally, the first robot may obtain the traveling information from a storage unit corresponding to the first robot, and/or obtain the traveling information of the first robot from the control terminal through interaction with the control terminal.

After detecting no positioning identifier, the first robot may still in a moving state for a reason such as inertia, the first robot may determine the target traveling route through the historical traveling information, and then determine the deviation distance and the deviation angle between the first robot and the target traveling route; or the first robot may determine the historical traveling information corresponding to the first robot through a corresponding movement speed, a historical movement time, and the like, or predict, through a movement speed and a target traveling time corresponding to the first robot, the target traveling route that cannot be reached by the first robot because of detecting no positioning identifier, and then determine the deviation distance and the deviation angle between the first robot and the target traveling route according to the target traveling route and the traveling information.

Through the method, the first robot can determine a corresponding deviation distance and deviation angle through some operations, to reduce load on the control terminal and reduce dependence of the first robot on other devices at the time of performing route correction.

For example, as shown in a side view of a rack in FIG. 4, an environment feature around a first robot is obtained through a laser point cloud radar, a feature point of a rack leg is identified according to a preset rule, and incorrect identification is excluded with reference to a shape, a distance, and other information and with reference to a corresponding algorithm, to precisely determine a position of the robot. A rack leg may be identified through deep learning, a target detection algorithm of a laser point cloud based on an aerial view, template matching of a laser point cloud, or clustering with luminance of a mounted reflector as a feature to calculate a current position, and an optimal solution is taken to perform pose estimation.

It should be noted that when a laser radar is arranged at the top of the first robot, a point cloud image corresponding to a top view of a rack may be obtained through the laser radar, then an environment feature around the first robot is obtained by analyzing the point cloud image, a feature point of a rack leg is identified according to a preset rule, and incorrect identification is excluded with reference to a shape, a distance, and other information and with reference to a corresponding algorithm, to precisely determine a position of the robot.

Through the deep learning, a data set may be obtained according to a point cloud radar, geometric features such as an inflection point and a line segment at an edge of a rack leg are extracted, and a training set is generated. Through a deep learning model (for example, 3D CNN model), model prediction (map) is generated. When point cloud data is continuously adopted, matching is performed according to the model continuously, and then a pose of the robot is obtained.

The template matching may be matching between a depth map and a template map of a laser point cloud, for example, PCL 3D point cloud matching. After the matching, a rotation matrix of the depth map relative to the template map, and a position and an angle of the current robot are obtained.

Through the method, an operation scenario in which the surrounding environment is not stable does not depend on a unique feature point, thereby improving identification accuracy of the laser point cloud, improving efficiency of the process of estimating the deviation distance and the deviation angle of the first robot, and shortening the processing time.

Optionally, the deviation distance and the deviation angle between the first robot and the target traveling route corresponding to the first robot may be obtained through data of a chassis motor; the deviation angle corresponding to the first robot may be obtained through data of an inertial measurement unit (Inertial Measurement Unit, IMU); or the deviation angle and the deviation distance between the first robot and the target traveling route corresponding to the first robot may be determined through a combination of data of the laser point cloud, data of an IMU, and data of a chassis motor, to further improve positioning accuracy.

Optionally, before operation S303, the method further includes: determining, according to the environment feature and the traveling information of the first robot, a target zone in which the first robot is located; determining a target safety level corresponding to the target zone according to the target zone and a preset correspondence between zones and safety levels; and determining the safety zone range corresponding to the first robot according to the target safety level.

Specifically, a higher safety level requires a smaller probability that the robot has a collision. To ensure that the robot is safe and has fewer collisions, the safety zone range corresponding to the first robot may be correspondingly set larger in a zone with a high safety level, thereby reducing the collision probability.

In block S303: determining whether an obstacle exists in a safety zone range corresponding to the first robot.

Specifically, the obstacle may include at least one of the following information: a rack, a wall, a person, and a robot.

Optionally, whether an obstacle exists may be determined using a laser radar. Specifically, identification of a laser radar point cloud is provided with an obstacle avoidance function. When an aisle in which the robot travels is obstructed by an obstacle, the aisle has an end, a worker is passing through, or another status occurs, the laser radar can identify the obstacle, and send a message to the control terminal. In this case, the robot performing route correction moves in another direction, or when route correction cannot be performed completely, the robot reports fault information to the control terminal, and waits for human intervention.

The safety zone range corresponding to the first robot may be a circular zone determined with the first robot as the center of a circle and a preset length as the radius. In an embodiment, a zone in a specific shape, for example, any one of a rectangle, a square, and a polygon may alternatively be set outward as the safety zone range according to the center of the first robot. The polygon may be correspondingly set according to an outer shape of the robot.

In a possible implementation, if the obstacle includes a second robot, the determining whether an obstacle exists in a safety zone range corresponding to the first robot includes: sending a first query message to the second robot; receiving movement information sent by the second robot according to the first query message, where the movement information includes a movement route and a movement speed; determining, according to the movement route and the movement speed, whether the second robot travels into the safety zone range in preset duration; and determining, if the second robot does not travel into the safety zone range, that no obstacle exists in the safety zone range corresponding to the first robot.

The preset duration may be set according to duration required by the first robot to correct the traveling route. For example, the preset duration may be equal to duration required by the first robot to perform traveling route correction.

Through the method, the first robot may interact or coordinate with another robot, to determine whether an obstacle exists in the safety zone range corresponding to the first robot, and an operation condition required when the first robot performs route correction can be preferentially satisfied, thereby ensuring safety of the first robot in the route correction process, improving a success rate of the route correction of the first robot, and avoiding interfering with operations of the another robot.

In a possible implementation, the obstacle includes a second robot; and the determining whether an obstacle exists in a safety zone range corresponding to the first robot includes: sending a second query message to a control terminal; and receiving a query result sent by the control terminal, where the query result is used for indicating whether an obstacle exists in the safety zone range, the query result is determined by the control terminal according to movement information of all second robots, and the movement information includes a movement route and a movement speed.

Through the method, the first robot interacts with the control terminal, to determine whether an obstacle exists in the safety range corresponding to the first robot, so that the control terminal can perform overall planning or whole coordination on movement of the robot, to improve whole running efficiency of a warehouse logistics system.

In block S304: controlling the first robot to perform route correction according to the deviation distance and the deviation angle if no obstacle exists in the safety zone range, to cause the first robot to move to the target traveling route again.

A case that the first robot deviates from the target traveling route corresponding to the first robot may correspond to different statuses. For example, the statuses may include: the deviation distance is large and the deviation angle is small, the deviation distance is small and the deviation angle is large, or the deviation distance and the deviation angle are both large.

In a possible implementation, the controlling the first robot to perform route correction according to the deviation distance and the deviation angle includes: determining, if the deviation distance is greater than or equal to a first preset value and the deviation angle is less than a second preset value, a minimum distance between the first robot and an obstacle around the first robot according to the environment feature; and controlling, if the minimum distance is greater than or equal to a preset safety distance, the first robot to move in a first preset mode and a second preset mode alternately, where the first preset mode is used for reducing the deviation angle, and the second preset mode is used for reducing the deviation distance.

Specifically, if the deviation distance is greater than or equal to a first preset value and the deviation angle is less than a second preset value, that is, as shown in FIG. 5, the deviation distance between the first robot and the target traveling route corresponding to the first robot is large and the deviation angle between the first robot and the target traveling route corresponding to the first robot is small, whether the distance between the first robot and the surrounding obstacle is greater than or equal to the safety distance may be first determined according to the environment feature corresponding to the first robot; and if the distance between the first robot and the surrounding obstacle is greater than or equal to the safety distance, the first robot is controlled to move in the first preset mode and the second preset mode alternately, to gradually reduce the deviation angle and the deviation distance. It may be understood that the first robot is continuously moving in the route correction process, and the distance between the first robot and the surrounding obstacle is also continuously changing. In some embodiments, a magnitude relationship between the minimum distance between the first robot and the obstacle around the first robot and the preset safety distance may be monitored in real time, to control the movement mode of the first robot.

In the process of controlling the first robot to move in the first preset mode and the second preset mode alternately, an opportune moment at which the first preset mode is alternated with the second preset mode may be determined according to a relative position relationship between the position of the first robot and another object in the aisle and/or a relative position relationship between the position of the first robot and the target traveling route. For example, after the first robot moves for a time T1 in the second preset mode, if it is detected that the deviation angle between the first robot and the target traveling route corresponding to the first robot is greater than a corresponding preset value, the first robot is controlled to move in the first preset mode, to reduce the deviation angle of the first robot; and after the first robot moves for a time T2 in the first preset mode, if it is detected that the deviation distance between the first robot and the target traveling route corresponding to the first robot is greater than a corresponding preset value, the first robot is controlled again to move in the second preset mode, to reduce the deviation distance. Such an alternation is performed, until the first robot moves to the target traveling route again.

The first robot usually includes two driving wheels, and by controlling the two driving wheels to move in different manners, the first robot can be controlled to advance, retreat, turn, and rotate. The two driving wheels of the first robot may move in any one of the following manners: the same rotational speed and different turning directions, the same rotational speed and the same turning direction, different rotational speeds and different turning directions, and different rotational speeds and the same turning direction. When the two driving wheels of the first robot move at the same rotational speed and in the same turning direction, the first robot can move forward or backward; when the two driving wheels of the first robot move at the same rotational speed and in different turning directions, the first robot can rotate in the original place; when the two driving wheels of the first robot move at different rotational speeds and in different turning directions, the first robot can rotate out of the original place, that is, the first robot rotates while moving; and when the two driving wheels of the first robot move at different rotational speeds and in the same turning direction, if the rotational speeds of the two driving wheels differ greatly, the first robot may quickly turn, and if the rotational speeds of the two driving wheels differ slightly, the first robot may slightly deflect, and by changing the turning directions of the two driving wheels simultaneously at specific intervals, the first robot may further move in a curved line.

Specifically, the first preset mode may correspond to a case that the two driving wheels of the first robot move in any one of the foregoing manners or any combination corresponding to the foregoing manners, to reduce the deviation angle between the first robot and the target traveling route corresponding to the first robot. The second preset mode may also correspond to a case that the two driving wheels of the first robot move in any one of the foregoing manners or any combination corresponding to the foregoing manners, to reduce the deviation distance between the first robot and the target traveling route corresponding to the first robot. It should be further noted that the first robot may be further controlled, according to different environments around the first robot, to move to a large extent or a small extent by setting rotational speeds with different magnitudes or turning angles with different magnitudes. For example, when a zone in which no obstacle exists around the first robot is large, the first robot may be controlled to perform coarse adjustment, that is, correct the traveling route to a large extent; and when a zone in which no obstacle exists around the first robot is small, the first robot may be controlled to perform fine adjustment, that is, correct the traveling route to a small extent. It should be noted that when the first preset mode is applied in different scenarios, movement manners of the driving wheels corresponding to the first preset mode may be the same or different; and when the second preset mode is applied in different scenarios, movement manners of the driving wheels corresponding to the first preset mode may also be the same or different.

It should be noted that the foregoing descriptions about the first preset mode and the second preset mode are similarly applicable to other possible implementations.

Through the method, the first robot is enabled to adjust the deviation angle and the deviation distance between the first robot and the corresponding target traveling route according to the surrounding environment, so that the first robot can correct the traveling route of the first robot, and find the target traveling route corresponding to the first robot again; and interference to the surrounding object can be reduced, to improve safety.

In a possible implementation, the controlling the first robot to perform route correction according to the deviation distance and the deviation angle includes: determining a second zone range according to the environment feature if the deviation distance is greater than or equal to a first preset value and the deviation angle is less than a second preset value, where the second zone range is a zone in which no obstacle exists around the first robot; controlling, if the second zone range is greater than or equal to a third preset value, the first robot to move in a first preset mode, and controlling, after determining that the first robot moves into a first preset range, the first robot to move in the first preset mode and a second preset mode alternately; and controlling, if the second zone range is greater than or equal to a fourth preset value and less than a third preset value, the first robot to move in a first preset mode and a second preset mode alternately, where the first preset mode is used for reducing the deviation angle, and the second preset mode is used for reducing the deviation distance.

Specifically, if the deviation distance is greater than or equal to a first preset value and the deviation angle is less than a second preset value, it indicates that the deviation distance between the first robot and the target traveling route corresponding to the first robot is large and the deviation angle between the first robot and the target traveling route corresponding to the first robot is small. The second zone range, that is, the zone in which no obstacle exists around the first robot is determined according to the environment feature around the first robot. When the zone in which no obstacle exists around the first robot is large, that is, the second zone range is greater than or equal to the third preset value, the first robot may be first controlled to rotate by a specific angle to a large extent, to cause one end of the first robot to be close to the target traveling route. In this case, an angle between the traveling direction of the first robot and the target traveling route may be an acute angle. Then, when the first robot moves into the first preset range and is relatively close to the target traveling route, the first robot is controlled to move in the first preset mode and the second preset mode alternately, to control the first robot to gradually move to the target traveling route. It may be understood that the first robot may slowly approach the target traveling route to a small extent through fine adjustment, to ensure safety of the first robot and safety of a rack, another robot, or a person nearby. When the second zone range is greater than or equal to the fourth preset value and less than the third preset value, that is, space in which no obstacle exists around the first robot is small but can satisfy that the first robot performs route correction, the first robot may be controlled to move to a small extent in the first preset mode and the second preset mode alternately, and slowly move to the target traveling route. The first preset range may be a zone formed by using the target traveling route as an axis and extending to both sides with a specific shape, and may be a zone in any shape such as a rectangular zone or a circular zone. A magnitude relationship between the second zone range and the third preset value or the fourth preset value that are compared may be a magnitude relationship between the area corresponding to the second zone range and the third preset value or the fourth preset value that are compared.

Through the method, when the first robot has a large deviation distance and a small deviation angle, if the surrounding space is sufficiently large, the front end of the first robot in the traveling direction is enabled to approach the target traveling route through coarse adjustment, and then the first robot is enabled to move in the first preset mode and the second preset mode alternately, to gradually approach the target traveling route through fine adjustment to a small extent, thereby improving route correction efficiency of the first robot; and if the surrounding space is small but can satisfy that the first robot performs route correction, the traveling route of the first robot is corrected through fine adjustment, which can improve safety of the first robot and the object around the first robot, and improve a success rate of route correction.

In a possible implementation, the controlling the first robot to perform route correction according to the deviation distance and the deviation angle includes: determining, if the deviation distance is greater than or equal to a first preset value and the deviation angle is less than a second preset value, a minimum distance between the first robot and an obstacle around the first robot according to the environment feature; and controlling, if the minimum distance is greater than or equal to a first preset safety distance and less than a second preset safety distance, the first robot to move in a first preset mode and a second preset mode alternately, controlling, if the minimum distance is greater than or equal to the second preset safety distance, the first robot to move in the first preset mode, and controlling, if the deviation distance is less than or equal to a fifth preset value, the first robot to move in the first preset mode and the second preset mode alternately, where the first preset mode is used for reducing the deviation angle, and the second preset mode is used for reducing the deviation distance.

Specifically, when the deviation distance between the first robot and the target traveling route corresponding to the first robot is greater than or equal to the first preset value and the deviation angle between the first robot and the target traveling route corresponding to the first robot is less than the second preset value, that is, the deviation distance between the first robot and the target traveling route corresponding to the first robot is large and the deviation angle between the first robot and the target traveling route corresponding to the first robot is small, if the minimum distance from the first robot to the obstacle around the first robot is greater than or equal to the first preset safety distance and less than the second preset safety distance, it indicates that the distance from the first robot to the surrounding obstacle is small but can satisfy that the first robot performs fine adjustment, and then the first robot is controlled to move in the first preset mode and the second preset mode alternately and slowly approach the target traveling route. When the distance from the first robot to the obstacle around the first robot is increased to be greater than or equal to the second preset value, it indicates that the safety range around the first robot is sufficiently large, and then the first robot is controlled to move in the first preset mode, until the deviation distance between the first robot and the target traveling route corresponding to the first robot is less than or equal to the fifth preset value, indicating that the first robot has moved to the vicinity of the target traveling route. To improve accuracy of route correction and reduce the error, the first robot is controlled to move in the first preset mode and the second preset mode alternately, to gradually slowly approach the target traveling route, and the orientation of the first robot is adjusted to be consistent with the target traveling route corresponding to the first robot.

Through the method, in a case that the deviation distance is large but the deviation angle is small, when the first robot is close to the obstacle, the position and the angle of the first robot may be first finely adjusted, so that the first robot slowly approaches the target traveling route and is far away from the obstacle. When the first robot moves and then is at a sufficiently large distance from the obstacle, the first robot is controlled to rotate by a large angle, to reduce the deflection angle of the first robot, so that one end of the first robot approaches the target traveling route to a large extent, until the first robot moves to the vicinity of the target traveling route. Then, the position and the angle of the first robot are finely adjusted again, so that the first robot slowly approaches the target traveling route, thereby improving accuracy of route correction and correction efficiency.

In a possible implementation, the controlling the first robot to perform route correction according to the deviation distance and the deviation angle includes: controlling, if the deviation angle is greater than or equal to a second preset value and the deviation distance is less than a first preset value, the first robot to move in a first preset mode, and controlling, after the first robot moves into a second preset range, the first robot to move in the first preset mode and a second preset mode alternately, where the first preset mode is used for reducing the deviation angle, and the second preset mode is used for reducing the deviation distance.

Specifically, when the deviation angle between the first robot and the target traveling route corresponding to the first robot is greater than or equal to the second preset value and the deviation distance between the first robot and the target traveling route corresponding to the first robot is less than the first preset value, that is, as shown in FIG. 6, the deviation distance between the first robot and the target traveling route corresponding to the first robot is small and the deviation angle between the first robot and the target traveling route corresponding to the first robot is large, the first robot may be first controlled to rotate by a large angle, to reduce the deviation angle to a large extent; and then the first robot is controlled to move in the first preset mode and the second preset mode alternately, and slowly approach the target traveling route.

Through the method, the deviation angle with large deviation can be first reduced, to correct the target orientation of the robot, then the first robot is controlled to move in the first preset mode and the second preset mode alternately, and the first robot is controlled to perform route correction through fine adjustment, which can improve the efficiency and the success rate of route correction.

In a possible implementation, the controlling the first robot to perform route correction according to the deviation position and the deviation angle includes: controlling, if the deviation position is greater than or equal to a first preset value and the deviation angle is greater than or equal to a second preset value, the first robot to move in a second preset mode and a first preset mode alternately, where the first preset mode is used for reducing the deviation angle, and the second preset mode is used for reducing the deviation distance.

Specifically, if the deviation position of the first robot is greater than or equal to the first preset value and the deviation angle is greater than or equal to the second preset value, that is, as shown in FIG. 7, the deviation distance and the deviation angle between the first robot and the target traveling route corresponding to the first robot are both large, the first robot may be controlled to move in the second preset mode and the first preset mode alternately, and the first robot may be controlled through fine adjustment to slowly approach the target traveling route.

When the deviation angle and the deviation distance between the first robot and the target traveling route corresponding to the first robot are both large, safety of the first robot and the object around the first robot can be ensured through the method, to improve the success rate of route correction of the first robot.

Optionally, the method further includes: sending a third message to the control terminal, where the third message is used for instructing the first robot to move to the target traveling route again; and receiving a fourth message sent by the control terminal, where the fourth message is sent after the control terminal receives the third message, the fourth message includes a target task, and the fourth message is used for instructing the first robot to perform the target task.

Through the method, after the first robot moves to the target traveling route again, the first robot can be controlled to perform a task in time, to improve utilization of the first robot.

It should be noted that during actual use, when the first robot performs route correction according to the deviation position and the deviation angle, only any one of the foregoing possible implementations may be performed, or any combination corresponding to the foregoing possible implementations may be performed.

In this embodiment of the present disclosure, by obtaining an environment feature around the first robot when the first robot detects no positioning identifier; determining a deviation distance and a deviation angle between the first robot and a target traveling route of the first robot according to the environment feature and traveling information of the first robot; and determining whether an obstacle exists in a safety zone range corresponding to the first robot, and controlling the first robot to perform route correction according to the deviation distance and the deviation angle if no obstacle exists in the safety zone range, to cause the first robot to move to the target traveling route again, safety of the first robot and the object around the first robot can be ensured, to improve the success rate of route correction of the first robot.

FIG. 8 is a schematic flowchart of still another robot control method according to the present disclosure. The method is applied to a first robot. As shown in FIG. 8, the method includes the following operations:

In block S801: obtaining an environment feature around the first robot when the first robot detects no positioning identifier.

In block S802: determining a deviation distance and a deviation angle between the first robot and a target traveling route of the first robot according to the environment feature and traveling information of the first robot.

Operation S801 and operation S802 have the same technical features as those of operation S201 and operation S202. For specific descriptions, reference may be made to operation S201 and operation S202. Details are not described herein.

In block S803: determining a first zone range according to the environment feature and the traveling information of the first robot.

The first zone range is a zone in which no obstacle exists around the first robot. The first zone range is a zone that changes in magnitude as the environment around the first robot changes.

For example, the first robot may determine the first zone range according to the environment feature and the traveling information of the first robot; or may determine the first zone range through interaction with another robot nearby and further with reference to a movement status of the another robot, or may receive, through interaction with the control terminal, the first zone range determined by the control terminal according to the environment feature corresponding to the first robot and the traveling information of the first robot.

In block S804: determining a second zone range according to the deviation distance and the deviation angle.

The second zone range is a minimum range required for controlling the first robot to perform route correction.

Specifically, the determining a second zone range according to the deviation distance and the deviation angle includes: determining a correction policy according to the deviation distance and the deviation angle; and determining a position and a required correction time of the first robot according to the correction policy, and determining the second zone range according to the position and the required correction time of the first robot.

In block S805: controlling the first robot to perform route correction according to the deviation distance and the deviation angle if the first zone range is greater than or equal to the second zone range, to cause the first robot to move to the target traveling route again.

If the first zone range is greater than or equal to the second zone range, it indicates that around the first robot, there is sufficient space in which the first robot can perform a corresponding route correction policy, to correct the traveling route of the first robot and cause the first robot to move to the target traveling route again.

In this embodiment of the present disclosure, further, a first zone range is determined according to the environment feature and the traveling information of the first robot; a second zone range is determined according to the deviation distance and the deviation angle; and the first robot is controlled to perform route correction according to the deviation distance and the deviation angle if the first zone range is greater than or equal to the second zone range, to cause the first robot to move to the target traveling route again, so that one relatively safe zone that changes as the environment around the first robot changes can be determined, which provides one safe environment for recovery of the first robot and can reduce interference to other machines as much as possible.

FIG. 9 is a schematic flowchart of yet another robot control method according to the present disclosure. The method is applied to a control terminal. As shown in FIG. 9, the method includes the following operations:

In block S901: after receiving a third message, sending a fourth message to a first robot.

The third message is sent by the first robot after moving to a target traveling route again.

The fourth message includes a target task, and the fourth message is used for instructing the first robot to perform the target task.

Optionally, the method further includes the following operations:

In block S902: obtaining movement information of a second robot when receiving a second query message sent by the first robot.

The movement information includes a movement route and a movement speed.

Optionally, the second robot may be a robot at a distance less than a preset threshold from the first robot separation, that is, the second robot is close to the first robot.

In block S903: determining a query result according to all the movement information of the second robot and a safety zone range corresponding to the first robot.

The query result is used for indicating whether an obstacle exists in the safety zone range.

Specifically, if it is determined according to the movement information of the second robot that the second robot travels into the safety zone range corresponding to the first robot when the first robot performs route correction, the query result indicates that an obstacle exists in the safety zone range of the first robot; otherwise, the query result indicates that no obstacle exists in the safety zone range of the first robot.

In block S904: sending the query result to the first robot.

Optionally, the method further includes:

In block S905: receiving a first message.

The first message is sent when the first robot detects no positioning identifier, and the first message includes an environment feature around the first robot.

In block S906: determining the target traveling route of the first robot according to the environment feature.

In block S907: determining the deviation distance and the deviation angle between the first robot and the target traveling route according to the target traveling route and the traveling information of the first robot.

Optionally, the traveling information includes at least two of the following information: a movement speed, a movement time, and a historical traveling track.

In block S908: sending the deviation distance and the deviation angle to the first robot.

Through the method, a control terminal can determine a target traveling route of a first robot according to an environment feature sent by the first robot, and then determine a deviation distance and a deviation angle between the first robot and a target traveling route according to traveling information of the first robot, so that result accuracy is high, and a data processing amount of the first robot can be reduced, to improve route correction efficiency of the first robot.

Alternatively, optionally, the method further includes: receiving a first message; determining a deviation distance and a deviation angle between the first robot and the target traveling route according to the environment feature, traveling information of the first robot, and the stored target traveling route of the first robot; and sending the deviation distance and the deviation angle to the first robot.

The first message is sent when the first robot detects no positioning identifier, and the first message includes an environment feature around the first robot.

The target traveling route may be a complete traveling route planned for the first robot in advance and stored in the control terminal; or may be a historical traveling route of the first robot in a storage region.

Through the method, the control terminal can determine, according to the target traveling route of the first robot that is stored in advance, the deviation distance and the deviation angle between the first robot and the target traveling route corresponding to the first robot, which can effectively reduce an operation amount of the control terminal, simplify an operation process, and improve the speed and efficiency of route correction of the first robot.

In this embodiment of the present disclosure, by sending, after receiving a third message, a fourth message to a first robot, the first robot can be controlled to process a corresponding task in time, to improve utilization of the first robot. Further, by obtaining movement information of a second robot when receiving a second query message sent by the first robot, determining a query result according to all the movement information of the second robot and a safety zone range corresponding to the first robot, and sending the query result to the first robot, whether the second robot exists in the safety zone range corresponding to the first robot can be determined, and the first robot is informed of the result, so that the first robot can perform a corresponding action according to the result. Further, by receiving a first message, determining the target traveling route of the first robot according to the environment feature, determining a deviation distance and a deviation angle between the first robot and the target traveling route according to the target traveling route and traveling information of the first robot, and sending the deviation distance and the deviation angle to the first robot, the deviation angle and the deviation distance between the first robot and the target traveling route corresponding to the first robot can be determined, and are sent to the first robot, to reduce an operation amount of the first robot, increase a data processing speed of the first robot, and improve efficiency of traveling route correction of the first robot.

FIG. 10 is a schematic flowchart of yet another robot control method according to the present disclosure. The method is applied to a control terminal. As shown in FIG. 10, the method includes the following operations:

In block S1001: receiving a first message sent by a first robot.

The first message is sent after the first robot detects no positioning identifier, and the first message includes an environment feature around the first robot.

In block S1002: determining a deviation distance and a deviation angle between the first robot and a target traveling route according to the environment feature and traveling information of the first robot.

In block S1003: determining a route correction policy of the first robot according to the deviation distance and the deviation angle.

In a possible implementation, the determining a route correction policy of the first robot according to the deviation distance and the deviation angle includes: obtaining movement information of a second robot when receiving a query message sent by the first robot, where the movement information includes a movement route and a movement speed; determining a query result according to the movement information of the second robot and a safety zone range corresponding to the first robot, where the query result is used for indicating whether an obstacle exists in the safety zone range; and sending the query result to the first robot.

Optionally, before the determining a query result according to the movement information of the second robot and a safety zone range corresponding to the first robot, the method further includes: determining, according to the deviation distance and the deviation angle, a target zone in which the first robot is located; determining a target safety level corresponding to the target zone according to the target zone and a preset correspondence between zones and safety levels; and determining the safety zone range corresponding to the first robot according to the target safety level.

Optionally, when the control terminal determines a correction policy with reference to a safety level, the following manner may be further included:

When the safety level is a high safety level, the control terminal delivers an instruction message to the first robot, to instruct the first robot to pause movement. If a worker confirms that there is no potential safety hazard on site, the worker starts a route correction process of the first robot, and monitors a position of the first robot all the time. When the robot moves to the target traveling route again, the worker triggers a message to report a deviation position and a deviation angle of the first robot to the control terminal. When confirming that the first robot has moved to the target traveling route, the control terminal continue to deliver a task to the first robot.

When the safety level is a high safety level, a dispatching system blocks a specific zone for the first robot, to forbid other robots from entering the zone, confirms safety and space adequacy around the first robot, and delivers a route correction instruction. If safety is poor and space is inadequate around the first robot, the first robot is controlled to halt in the original place and wait, and the environment around the first robot is continuously detected. When route correction may be performed, the control terminal delivers a route recovery instruction to the first robot again. The first robot receives the instruction, and starts a route correction program. After moving to the target traveling route again, the first robot sends a message to the control terminal to report information about a deviation position and a deviation angle of the first robot. When confirming that the first robot has moved to the target traveling route, the control terminal continue to deliver a task to the first robot.

When the safety level is a common safety level, the control terminal directly delivers a route correction instruction, and the robot identifies a surrounding environment according to a laser point cloud, confirms whether route correction may be performed, and starts route correction after route correction may be performed. After route correction succeeds, the robot reports its current deviation position and deviation angle to the control terminal, and waits or receives a task instruction delivered by the control terminal.

In a possible implementation, the determining a route correction policy of the first robot according to the deviation distance and the deviation angle includes: determining, if the deviation distance is greater than or equal to a first preset value and the deviation angle is less than a second preset value, a minimum distance between the first robot and an obstacle around the first robot according to the environment feature; and controlling, if the minimum distance is greater than or equal to a first preset safety distance, the first robot to move in a first preset mode and a second preset mode alternately, where the first preset mode is used for reducing the deviation angle, and the second preset mode is used for reducing the deviation distance.

In a possible implementation, the controlling the first robot to move according to the deviation distance and the deviation angle includes: determining a second zone range according to the environment feature if the deviation distance is greater than or equal to a first preset value and the deviation angle is less than a second preset value, where the second zone range is a zone in which no obstacle exists around the first robot; controlling, if the second zone range is greater than or equal to a third preset value, the first robot to move in a first preset mode, and controlling, after determining that the first robot moves into a first preset range, the first robot to move in the first preset mode and a second preset mode alternately; and controlling, if the second zone range is greater than or equal to a fourth preset value and less than a second preset value, the first robot to move in a first preset mode and a second preset mode alternately, where the first preset mode is used for reducing the deviation angle, and the second preset mode is used for reducing the deviation distance.

In a possible implementation, the determining a route correction policy of the first robot according to the deviation distance and the deviation angle includes: determining, if the deviation distance is greater than or equal to a first preset value and the deviation angle is less than a second preset value, a minimum distance between the first robot and an obstacle around the first robot according to the environment feature; and controlling, if the minimum distance is greater than or equal to a first preset safety distance and less than a second preset safety distance, the first robot to move in a first preset mode and a second preset mode alternately, controlling, if the minimum distance is greater than or equal to the second preset safety distance, the first robot to move in the first preset mode, and controlling, if the deviation distance is less than or equal to a fifth preset value, the first robot to move in the first preset mode and the second preset mode alternately, where the first preset mode is used for reducing the deviation angle, and the second preset mode is used for reducing the deviation distance.

In a possible implementation, the determining a route correction policy of the first robot according to the deviation distance and the deviation angle includes: controlling, if the deviation angle is greater than or equal to a second preset value and the deviation distance is less than a first preset value, the first robot to move in a first preset mode, and controlling, after the first robot moves into a second preset range, the first robot to move in the first preset mode and a second preset mode alternately, where the first preset mode is used for reducing the deviation angle, and the second preset mode is used for reducing the deviation distance.

In a possible implementation, the determining a route correction policy of the first robot according to the deviation distance and the deviation angle includes: controlling, if the deviation position is greater than or equal to a first preset value and the deviation angle is greater than or equal to a second preset value, the first robot to move in a second preset mode and a first preset mode alternately, where the first preset mode is used for reducing the deviation angle, and the second preset mode is used for reducing the deviation distance.

In block S1004: sending the route correction policy to the first robot, where the route correction policy is used for instructing the first robot to perform route correction, to move to the target traveling route again.

Optionally, the method further includes: determining whether a third robot exists in a safety zone range corresponding to the first robot in preset duration; and controlling, if the third robot exists, the third robot to be forbidden from traveling into the safety zone range.

Through the method, one safe environment can be provided for the first robot to perform route correction, thereby improving safety of the first robot and the object around the first robot and ensuring the success rate of route correction of the first robot.

In a possible implementation, the determining a deviation distance and a deviation angle between the first robot and a target traveling route according to the environment feature and traveling information of the first robot includes: determining the target traveling route according to the environment feature; and determining the deviation distance and the deviation angle between the first robot and the target traveling route according to the target traveling route and the traveling information of the first robot.

In a possible implementation, the determining a deviation distance and a deviation angle between the first robot and a target traveling route according to the environment feature and traveling information of the first robot includes: determining a deviation distance and a deviation angle between the first robot and the target traveling route according to the environment feature, traveling information of the first robot, and the pre-stored target traveling route of the first robot.

Optionally, the method further includes: sending, after receiving a third message, a fourth message to a first robot, where the third message is sent by the first robot after moving to a target traveling route again, the fourth message includes a target task, and the fourth message is used for instructing the first robot to perform the target task.

Optionally, the traveling information includes at least two of the following information: a movement speed, a movement time, and a historical traveling track.

In this embodiment of the present disclosure, by receiving a first message that is sent by a first robot after the first robot detects no positioning identifier and that includes an environment feature around the first robot; determining a deviation distance and a deviation angle between the first robot and a target traveling route according to the environment feature and traveling information of the first robot; determining a route correction policy of the first robot according to the deviation distance and the deviation angle; and sending, to the first robot, the route correction policy that is used for instructing the first robot to perform route correction, to move to the target traveling route again, the robot can be controlled to automatically correct its traveling route, thereby reducing worker intervention and improving route correction efficiency of the robot.

FIG. 11 is a schematic flowchart of yet another robot control method according to the present disclosure. The method is applied to a first robot. As shown in FIG. 11, the method includes the following operations:

In block S1101: sending a first message to a control terminal.

The first message is sent after the first robot detects no positioning identifier, and the first message includes an environment feature around the first robot.

In block S1102: receiving a route correction policy sent by the control terminal, where the route correction policy is determined by the control terminal according to a deviation distance and a deviation angle.

In block S1103: performing the route correction policy, to move to a target traveling route again.

Optionally, the method further includes:

In block S1104: sending a query message to a control terminal, and receive a query result sent by the control terminal.

The query result is used for indicating whether an obstacle exists in a safety zone range corresponding to the first robot, the query result is determined by the control terminal according to movement information of all second robots, and the movement information includes a movement route and a movement speed.

Optionally, the method further includes the following operations:

In block S1105: sending a third message to the control terminal.

The third message is used for instructing the first robot to move to the target traveling route again.

In block S1106: receiving a fourth message sent by the control terminal.

The fourth message is sent after the control terminal receives the third message, the fourth message includes a target task, and the fourth message is used for instructing the first robot to perform the target task.

In this embodiment of the present disclosure, by receiving a first message sent by a first robot, determining a deviation distance and a deviation angle between the first robot and a target traveling route according to the environment feature and traveling information of the first robot, determining a route correction policy of the first robot according to the deviation distance and the deviation angle, and sending the route correction policy to the first robot, where the route correction policy is used for instructing the first robot to perform route correction, to move to the target traveling route again, an operation amount of the first robot can be reduced, a processing process of the first robot can be simplified, and route correction efficiency of the first robot can be improved.

FIG. 12 is a schematic structural diagram of a robot control apparatus according to the present disclosure. As shown in FIG. 12, the apparatus includes:

an obtaining module 121, configured to obtain an environment feature around the first robot when a first robot detects no positioning identifier; and a processing module 122, configured to determine a deviation distance and a deviation angle between the first robot and a target traveling route of the first robot according to the environment feature and traveling information of the first robot.

The processing module 122 is further configured to control the first robot to perform route correction according to the deviation distance and the deviation angle, to cause the first robot to move to the target traveling route again.

Optionally, the processing module 122 is specifically configured to determine whether an obstacle exists in a safety zone range corresponding to the first robot; and control the first robot to perform route correction according to the deviation distance and the deviation angle if no obstacle exists in the safety zone range.

Optionally, the processing module 122 is specifically configured to determine a first zone range according to the environment feature and the traveling information of the first robot, where the first zone range is a zone in which no obstacle exists around the first robot; determine a second zone range according to the deviation distance and the deviation angle, where the second zone range is a minimum range required for controlling the first robot to perform route correction; and control the first robot to perform route correction according to the deviation distance and the deviation angle if the first zone range is greater than or equal to the second zone range.

Optionally, the obstacle includes a second robot, and that the processing module 122 is specifically configured to determine whether an obstacle exists in a safety zone range corresponding to the first robot includes: sending a first query message to the second robot; receive movement information sent by the second robot according to the first query message, where the movement information includes a movement route and a movement speed; determine, according to the movement route and the movement speed, whether the second robot travels into the safety zone range in preset duration; and determine, if the second robot does not travel into the safety zone range, that no obstacle exists in the safety zone range corresponding to the first robot.

Optionally, the obstacle includes a second robot, and the processing module 122 is specifically configured to send a second query message to a control terminal; and receive a query result sent by the control terminal, where the query result is used for indicating whether an obstacle exists in the safety zone range, the query result is determined by the control terminal according to movement information of all second robots, and the movement information includes a movement route and a movement speed.

Optionally, the processing module 122 is further configured to determine, according to the environment feature and the traveling information of the first robot, a target zone in which the first robot is located; determine a target safety level corresponding to the target zone according to the target zone and a preset correspondence between zones and safety levels; and determine the safety zone range corresponding to the first robot according to the target safety level.

Optionally, the processing module 122 is specifically configured to send a first message to a control terminal, where the first message includes the environment feature; and receive the deviation distance and the deviation angle that are between the first robot and the target traveling route that are determined by the control terminal according to the environment feature and the traveling information of the first robot.

Optionally, the processing module 122 is specifically configured to obtain the traveling information of the first robot; determine the target traveling route according to the environment feature; and determine the deviation distance and the deviation angle between the first robot and the target traveling route according to the target traveling route and the traveling information.

Optionally, the processing module 122 is specifically configured to determine, if the deviation distance is greater than or equal to a first preset value and the deviation angle is less than a second preset value, a minimum distance between the first robot and an obstacle around the first robot according to the environment feature; and control, if the minimum distance is greater than or equal to a first preset safety distance, the first robot to move in a first preset mode and a second preset mode alternately, where the first preset mode is used for reducing the deviation angle, and the second preset mode is used for reducing the deviation distance.

Optionally, the processing module 122 is specifically configured to determine a second zone range according to the environment feature if the deviation distance is greater than or equal to a first preset value and the deviation angle is less than a second preset value, where the second zone range is a zone in which no obstacle exists around the first robot; control, if the second zone range is greater than or equal to a third preset value, the first robot to move in a first preset mode, and controlling, after determining that the first robot moves into a first preset range, the first robot to move in the first preset mode and a second preset mode alternately; and control, if the second zone range is greater than or equal to a fourth preset value and less than a second preset value, the first robot to move in a first preset mode and a second preset mode alternately, where the first preset mode is used for reducing the deviation angle, and the second preset mode is used for reducing the deviation distance.

Optionally, the processing module 122 is specifically configured to determine, if the deviation distance is greater than or equal to a first preset value and the deviation angle is less than a second preset value, a minimum distance between the first robot and an obstacle around the first robot according to the environment feature; and control, if the minimum distance is greater than or equal to a first preset safety distance and less than a second preset safety distance, the first robot to move in a first preset mode and a second preset mode alternately, controlling, if the minimum distance is greater than or equal to the second preset safety distance, the first robot to move in the first preset mode, and controlling, if the deviation distance is less than or equal to a fifth preset value, the first robot to move in the first preset mode and the second preset mode alternately, where the first preset mode is used for reducing the deviation angle, and the second preset mode is used for reducing the deviation distance.

Optionally, the processing module 122 is specifically configured to control, if the deviation angle is greater than or equal to a second preset value and the deviation distance is less than a first preset value, the first robot to move in a first preset mode, and control, after the first robot moves into a second preset range, the first robot to move in the first preset mode and a second preset mode alternately, where the first preset mode is used for reducing the deviation angle, and the second preset mode is used for reducing the deviation distance.

Optionally, the processing module 122 is specifically configured to control, if the deviation position is greater than or equal to a first preset value and the deviation angle is greater than or equal to a second preset value, the first robot to move in a second preset mode and a first preset mode alternately, where the first preset mode is used for reducing the deviation angle, and the second preset mode is used for reducing the deviation distance.

Optionally, the processing module 122 is further configured to determine the target traveling route of the first robot, where the target traveling route includes a plurality of positioning identifiers.

Optionally, the processing module 122 is specifically configured to obtain at least one feature image corresponding to an environment around the robot; determine, according to the at least one feature image and a historical traveling route of the first robot, positions of at least two rack legs in an aisle in which the first robot is located; and determine the target traveling route of the first robot according to the positions of the at least two rack legs.

Optionally, the processing module 122 is further configured to send a third message to the control terminal, where the third message is used for instructing the first robot to move to the target traveling route again; and receive a fourth message sent by the control terminal, where the fourth message is sent after the control terminal receives the third message, the fourth message includes a target task, and the fourth message is used for instructing the first robot to perform the target task.

Optionally, the traveling information includes at least two of the following information: a movement speed, a movement time, and a historical traveling track.

The robot control apparatus may perform the foregoing robot control method. For its content and effect, reference may be made to the method embodiment part, and details are not described again.

FIG. 13 is a schematic structural diagram of another robot control apparatus according to the present disclosure. As shown in FIG. 13, the apparatus includes:

a processing module 131, configured to send, after receiving a third message, a fourth message to a first robot, where the third message is sent by the first robot after moving to a target traveling route again, the fourth message includes a target task, and the fourth message is used for instructing the first robot to perform the target task.

Optionally, the processing module 131 is specifically configured to obtain movement information of a second robot when receiving a second query message sent by the first robot, where the movement information includes a movement route and a movement speed; determine a query result according to all the movement information of the second robot and a safety zone range corresponding to the first robot, where the query result is used for indicating whether an obstacle exists in the safety zone range; and send the query result to the first robot.

Optionally, the method further includes:

a receiving module 132, configured to receive a first message, where the first message is sent when the first robot detects no positioning identifier, and the first message includes an environment feature around the first robot; and the processing module 131 is further configured to determine the target traveling route of the first robot according to the environment feature; and determine the deviation distance and the deviation angle between the first robot and the target traveling route according to the target traveling route and the traveling information of the first robot.

a sending module 133, configured to send the deviation distance and the deviation angle to the first robot.

Optionally, the receiving module 132 is further configured to receive a first message, where the first message is sent when the first robot detects no positioning identifier, and the first message includes an environment feature around the first robot.

The processing module 131 is further configured to determine a deviation distance and a deviation angle between the first robot and the target traveling route according to the environment feature, traveling information of the first robot, and the stored target traveling route of the first robot.

The sending module 133 is further configured to send the deviation distance and the deviation angle to the first robot.

Optionally, the traveling information includes at least one of the following information: a movement speed, a movement time, and a historical traveling track.

The robot control apparatus may perform the foregoing robot control method. For its content and effect, reference may be made to the method embodiment part, and details are not described again.

FIG. 14 is a schematic structural diagram of still another robot control apparatus according to the present disclosure. As shown in FIG. 14, the apparatus includes:

a receiving module 141, configured to receive a first message sent by a first robot, where the first message is sent after the first robot detects no positioning identifier, and the first message includes an environment feature around the first robot;

a processing module 142, configured to determine a deviation distance and a deviation angle between the first robot and a target traveling route according to the environment feature and traveling information of the first robot, where the processing module 142 is further configured to determine a route correction policy of the first robot according to the deviation distance and the deviation angle; and a sending module 143, configured to send the route correction policy to the first robot, where the route correction policy is used for instructing the first robot to perform route correction, to move to the target traveling route again.

Optionally, the processing module 142 is specifically configured to obtain movement information of a second robot when receiving a query message sent by the first robot, where the movement information includes a movement route and a movement speed; determine a query result according to the movement information of the second robot and a safety zone range corresponding to the first robot, where the query result is used for indicating whether an obstacle exists in the safety zone range; and send the query result to the first robot.

Optionally, the processing module 142 is further configured to determine, according to the deviation distance and the deviation angle, a target zone in which the first robot is located; determine a target safety level corresponding to the target zone according to the target zone and a preset correspondence between zones and safety levels; and determine the safety zone range corresponding to the first robot according to the target safety level.

Optionally, the processing module 142 is specifically configured to determine, if the deviation distance is greater than or equal to a first preset value and the deviation angle is less than a second preset value, a minimum distance between the first robot and an obstacle around the first robot according to the environment feature; and control, if the minimum distance is greater than or equal to a first preset safety distance, the first robot to move in a first preset mode and a second preset mode alternately, where the first preset mode is used for reducing the deviation angle, and the second preset mode is used for reducing the deviation distance.

Optionally, the processing module 142 is specifically configured to determine a second zone range according to the environment feature if the deviation distance is greater than or equal to a first preset value and the deviation angle is less than a second preset value, where the second zone range is a zone in which no obstacle exists around the first robot; control, if the second zone range is greater than or equal to a third preset value, the first robot to move in a first preset mode, and controlling, after determining that the first robot moves into a first preset range, the first robot to move in the first preset mode and a second preset mode alternately; and control, if the second zone range is greater than or equal to a fourth preset value and less than a second preset value, the first robot to move in a first preset mode and a second preset mode alternately, where the first preset mode is used for reducing the deviation angle, and the second preset mode is used for reducing the deviation distance.

Optionally, the processing module 142 is specifically configured to determine, if the deviation distance is greater than or equal to a first preset value and the deviation angle is less than a second preset value, a minimum distance between the first robot and an obstacle around the first robot according to the environment feature; and control, if the minimum distance is greater than or equal to a first preset safety distance and less than a second preset safety distance, the first robot to move in a first preset mode and a second preset mode alternately, controlling, if the minimum distance is greater than or equal to the second preset safety distance, the first robot to move in the first preset mode, and controlling, if the deviation distance is less than or equal to a fifth preset value, the first robot to move in the first preset mode and the second preset mode alternately, where the first preset mode is used for reducing the deviation angle, and the second preset mode is used for reducing the deviation distance.

Optionally, the processing module 142 is specifically configured to control, if the deviation angle is greater than or equal to a second preset value and the deviation distance is less than a first preset value, the first robot to move in a first preset mode, and control, after the first robot moves into a second preset range, the first robot to move in the first preset mode and a second preset mode alternately, where the first preset mode is used for reducing the deviation angle, and the second preset mode is used for reducing the deviation distance.

Optionally, the processing module 142 is specifically configured to control, if the deviation position is greater than or equal to a first preset value and the deviation angle is greater than or equal to a second preset value, the first robot to move in a second preset mode and a first preset mode alternately, where the first preset mode is used for reducing the deviation angle, and the second preset mode is used for reducing the deviation distance.

Optionally, the processing module 142 is further configured to determine whether a third robot exists in a safety zone range corresponding to the first robot in preset duration; and control, if the third robot exists, the third robot to be forbidden from traveling into the safety zone range.

Optionally, the processing module 142 is specifically configured to determine the target traveling route according to the environment feature; and determine the deviation distance and the deviation angle between the first robot and the target traveling route according to the target traveling route and the traveling information of the first robot.

Optionally, the processing module 142 is specifically configured to determine a deviation distance and a deviation angle between the first robot and the target traveling route according to the environment feature, traveling information of the first robot, and the pre-stored target traveling route of the first robot.

Optionally, the processing module 142 is further configured to send, after receiving a third message, a fourth message to a first robot, where the third message is sent by the first robot after moving to a target traveling route again, the fourth message includes a target task, and the fourth message is used for instructing the first robot to perform the target task.

Optionally, the traveling information includes at least one of the following information: a movement speed, a movement time, and a historical traveling track.

The robot control apparatus may perform the foregoing robot control method. For its content and effect, reference may be made to the method embodiment part, and details are not described again.

FIG. 15 is a schematic structural diagram of yet another robot control apparatus according to the present disclosure. As shown in FIG. 15, the apparatus includes:

a sending module 151, configured to send a first message to a control terminal, where the first message is sent after the first robot detects no positioning identifier, and the first message includes an environment feature around the first robot;

a receiving module 152, configured to receive a route correction policy sent by the control terminal, where the route correction policy is determined by the control terminal according to a deviation distance and a deviation angle; and a processing module 153, configured to perform the route correction policy, to move to a target traveling route again.

Optionally, the sending module 151 is further configured to send a query message to a control terminal; and the receiving module is further configured to receive a query result sent by the control terminal, where the query result is used for indicating whether an obstacle exists in a safety zone range corresponding to the first robot, the query result is determined by the control terminal according to movement information of all second robots, and the movement information includes a movement route and a movement speed.

Optionally, the sending module 151 is further configured to send a third message to the control terminal, where the third message is used for instructing the first robot to move to the target traveling route again; and the receiving module 152 is further configured to receive a fourth message sent by the control terminal, where the fourth message is sent after the control terminal receives the third message, the fourth message includes a target task, and the fourth message is used for instructing the first robot to perform the target task.

The robot control apparatus may perform the foregoing robot control method. For its content and effect, reference may be made to the method embodiment part, and details are not described again.

Figure 16:
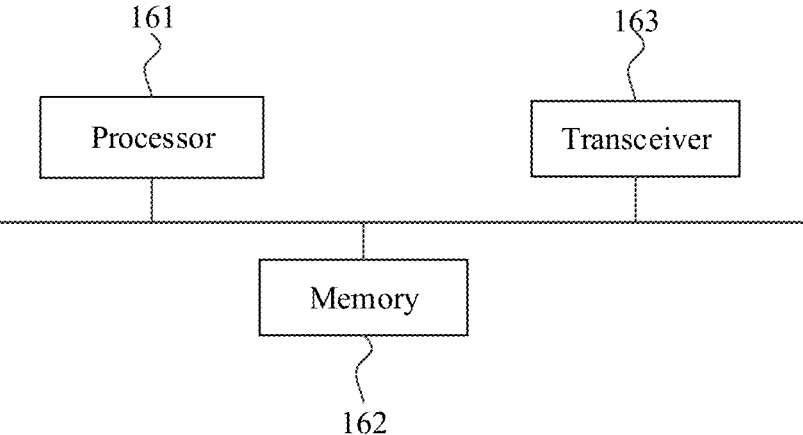
FIG. 16 is a schematic structural diagram of a robot according to the present disclosure.

FIG. 16 is a schematic structural diagram of a robot according to the present disclosure. As shown in FIG. 16, the robot of this embodiment includes: a processor 161 and a memory 162. The processor 161 is communicatively connected to the memory 162. The memory 162 is configured to store a computer program. The processor 161 is configured to invoke the computer program stored in the memory 162, to implement a method in the foregoing embodiments.

Optionally, the robot further includes: a transceiver 163, configured to communicate with another device.

The robot may perform the robot control method provided in the foregoing corresponding embodiments. For its content and effect, reference may be made to the method embodiment part, and details are not described again.

Figure 17:
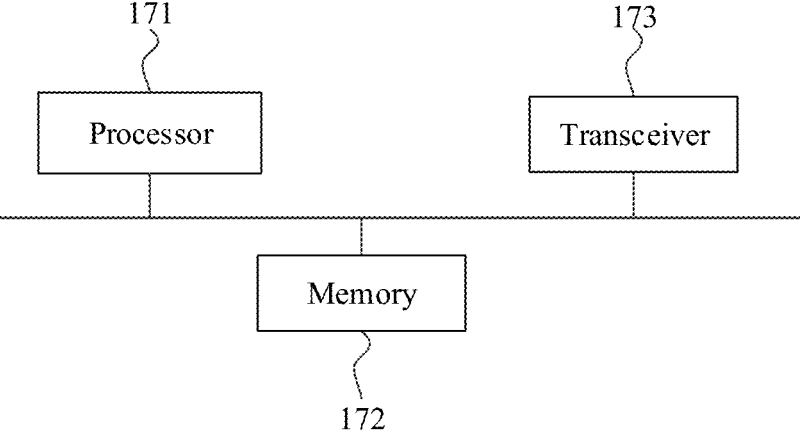
FIG. 17 is a schematic structural diagram of a control terminal according to the present disclosure.

FIG. 17 is a schematic structural diagram of a control terminal according to the present disclosure. As shown in FIG. 17, the control terminal of this embodiment includes: a processor 171 and a memory 172. The processor 171 is communicatively connected to the memory 172. The memory 172 is configured to store a computer program. The processor 171 is configured to invoke the computer program stored in the memory 172, to implement a method in the foregoing embodiments.

Optionally, the control terminal further includes: a transceiver 173, configured to communicate with another device.

The control terminal may perform the robot control method provided in the foregoing corresponding embodiments. For its content and effect, reference may be made to the method embodiment part, and details are not described again.

In a schematic structural diagram of a robot control system provided in the present disclosure, the system includes a robot provided in the foregoing embodiments and a control terminal corresponding to the robot.

The robot control system may perform the foregoing robot control method. For its content and effect, reference may be made to the method embodiment part, and details are not described again.

The present disclosure further provides a computer-readable storage medium. The computer-readable storage medium stores computer executable instructions, and when being executed by a processor, the computer executable instructions are used for implementing the method in any one of the foregoing method embodiments.

When the computer executable instructions stored in the computer-readable storage medium are executed by the processor, the foregoing robot control method can be implemented. For its content and effect, reference may be made to the method embodiment part, and details are not described again.

The present disclosure provides a computer program product, including a computer program/instruction. The computer program/instruction, when being executed by a processor, implements the method in any one of the foregoing method embodiments.

When the computer executable instructions stored in the computer-readable storage medium are executed by the processor, the foregoing robot control method can be implemented. For its content and effect, reference may be made to the method embodiment part, and details are not described again.

Finally, the foregoing embodiments are merely used for describing the technical solutions of the present disclosure, rather than limiting the present disclosure. Although the present disclosure is described in detail with reference to the foregoing embodiments, a person of ordinary skill in the art is to understand that they can still make modifications to the technical solutions described in the foregoing embodiments or make equivalent replacements on some or all of technical features therein. These modifications or replacements do not cause the essence of the corresponding technical solutions to depart from the scope of the technical solutions of the embodiments of the present disclosure.

What is claimed is:

1. A robot control method, performed by a first robot and comprising:

obtaining an environment feature around the first robot when the first robot detects no positioning identifier;

determining a deviation distance and a deviation angle between the first robot and a target traveling route of the first robot according to the environment feature and traveling information of the first robot; and controlling the first robot to perform route correction according to the deviation distance and the deviation angle, to cause the first robot to move to the target traveling route again;

wherein before the determining the deviation distance and the deviation angle between the first robot and the target traveling route according to the environment feature, the method comprises:

obtaining at least one feature image corresponding to an environment around the first robot;

determining, according to the at least one feature image and a historical traveling route of the first robot, positions of at least two rack legs in an aisle in which the first robot is located; and determining the target traveling route of the first robot according to the positions of the at least two rack legs;

wherein the target traveling route includes a plurality of positioning identifiers.

2. The method according to claim 1, wherein the controlling the first robot to perform route correction according to the deviation distance and the deviation angle comprises:

determining whether an obstacle exists in a safety zone range corresponding to the first robot; and controlling the first robot to perform route correction according to the deviation distance and the deviation angle if no obstacle exists in the safety zone range.

3. The method according to claim 2, wherein the obstacle comprises a second robot; and the determining whether an obstacle exists in a safety zone range corresponding to the first robot comprises:

sending a first query message to the second robot;

receiving movement information sent by the second robot according to the first query message, wherein the movement information comprises a movement route and a movement speed;

determining, according to the movement route and the movement speed, whether the second robot travels into the safety zone range in preset duration; and determining, if the second robot does not travel into the safety zone range, that no obstacle exists in the safety zone range corresponding to the first robot.

4. The method according to claim 2, wherein the obstacle comprises a second robot; and the determining whether an obstacle exists in a safety zone range corresponding to the first robot comprises:

sending a second query message to a control terminal; and receiving a query result sent by the control terminal, wherein the query result is used for indicating whether an obstacle exists in the safety zone range, the query result is determined by the control terminal according to movement information of all second robots, and the movement information comprises a movement route and a movement speed.

5. The method according to claim 2, wherein before the controlling the first robot to perform route correction according to the deviation distance and the deviation angle, the method further comprises:

determining, according to the environment feature and the traveling information of the first robot, a target zone in which the first robot is located;

determining a target safety level corresponding to the target zone according to the target zone and a preset correspondence between zones and safety levels; and determining the safety zone range corresponding to the first robot according to the target safety level.

6. The method according to claim 1, wherein the controlling the first robot to perform route correction according to the deviation distance and the deviation angle comprises:

determining a first zone range according to the environment feature and the traveling information of the first robot, wherein the first zone range is a zone in which no obstacle exists around the first robot;

determining a second zone range according to the deviation distance and the deviation angle, wherein the second zone range is a minimum range required for controlling the first robot to perform route correction; and controlling the first robot to perform route correction according to the deviation distance and the deviation angle if the first zone range is greater than or equal to the second zone range.

7. The method according to claim 1, wherein the controlling the first robot to perform route correction comprises:

determining, if the deviation distance is greater than or equal to a first preset value and the deviation angle is less than a second preset value, a minimum distance between the first robot and an obstacle around the first robot according to the environment feature; and controlling, if the minimum distance is greater than or equal to a first preset safety distance, the first robot to move in a first preset mode and a second preset mode alternately;

wherein the first preset mode is used for reducing the deviation angle, and the second preset mode is used for reducing the deviation distance.

8. The method according to claim 1, wherein the controlling the first robot to perform route correction comprises:

determining a second zone range according to the environment feature if the deviation distance is greater than or equal to a first preset value and the deviation angle is less than a second preset value, wherein the second zone range is a zone in which no obstacle exists around the first robot;

controlling, if the second zone range is greater than or equal to a third preset value, the first robot to move in a first preset mode;

controlling, after determining that the first robot moves into a first preset range, the first robot to move in the first preset mode and a second preset mode alternately; and controlling, if the second zone range is greater than or equal to a fourth preset value and less than a second preset value, the first robot to move in a first preset mode and a second preset mode alternately;

wherein the first preset mode is used for reducing the deviation angle, and the second preset mode is used for reducing the deviation distance.

9. The method according to claim 1, wherein the controlling the first robot to perform route correction comprises:

determining, if the deviation distance is greater than or equal to a first preset value and the deviation angle is less than a second preset value, a minimum distance between the first robot and an obstacle around the first robot according to the environment feature;

controlling, if the minimum distance is greater than or equal to a first preset safety distance and less than a second preset safety distance, the first robot to move in a first preset mode and a second preset mode alternately, or controlling, if the minimum distance is greater than or equal to the second preset safety distance, the first robot to move in the first preset mode, and controlling, if the deviation distance is less than or equal to a fifth preset value, the first robot to move in the first preset mode and the second preset mode alternately, wherein the first preset mode is used for reducing the deviation angle, and the second preset mode is used for reducing the deviation distance.

10. The method according to claim 1, wherein the controlling the first robot to perform route correction comprises:

controlling, if the deviation angle is greater than or equal to a second preset value and the deviation distance is less than a first preset value, the first robot to move in a first preset mode, and controlling, after the first robot moves into a second preset range, the first robot to move in the first preset mode and a second preset mode alternately;

wherein the first preset mode is used for reducing the deviation angle, and the second preset mode is used for reducing the deviation distance.

11. The method according to claim 1, wherein the controlling the first robot to perform route correction comprises:

controlling, if the deviation position is greater than or equal to a first preset value and the deviation angle is greater than or equal to a second preset value, the first robot to move in a second preset mode and a first preset mode alternately, wherein the first preset mode is used for reducing the deviation angle, and the second preset mode is used for reducing the deviation distance.

12. A robot, comprising:

at least one processor; and a memory communicatively connected to the at least one processor;

wherein the memory is configured to store instructions executable by the at least one processor, and wherein when the instructions are executed by the at least one processor, the at least one processor to is configured to:

obtain an environment feature around the first robot when the first robot detects no positioning identifier;

determine a deviation distance and a deviation angle between the first robot and a target traveling route of the first robot according to the environment feature and traveling information of the first robot;

determine, if the deviation distance is greater than or equal to a first preset value and the deviation angle is less than a second preset value, a minimum distance between the first robot and an obstacle around the first robot according to the environment feature;

control, if the minimum distance is greater than or equal to a first preset safety distance and less than a second preset safety distance, the first robot to move to the target traveling route again in a first preset mode and a second preset mode alternately, or control, if the minimum distance is greater than or equal to the second preset safety distance, the first robot to move to the target traveling route again in the first preset mode, and control, if the deviation distance is less than or equal to a fifth preset value, the first robot to move to the target traveling route again in the first preset mode and the second preset mode alternately;

wherein the first preset mode is used for reducing the deviation angle, and the second preset mode is used for reducing the deviation distance.

13. A non-transitory computer-readable storage medium storing computer executable instructions, and when being executed by a processor, the computer executable instructions are used to implement operations of:

obtaining an environment feature around the first robot when the first robot detects no positioning identifier;

determining a deviation distance and a deviation angle between the first robot and a target traveling route of the first robot according to the environment feature and traveling information of the first robot; and controlling the first robot to perform route correction according to the deviation distance and the deviation angle, to cause the first robot to move to the target traveling route again;

wherein before the determining a deviation distance and a deviation angle between the first robot and the target traveling route according to the environment feature, the method comprises:

obtaining at least one feature image corresponding to an environment around the first robot;

determining, according to the at least one feature image and a historical traveling route of the first robot, positions of at least two rack legs in an aisle in which the first robot is located; and determining the target traveling route of the first robot according to the positions of the at least two rack legs;

wherein the target traveling route includes a plurality of positioning identifiers.

14. The non-transitory computer-readable storage medium according to claim 13, wherein the controlling the first robot to perform route correction according to the deviation distance and the deviation angle comprises:

determining a first zone range according to the environment feature and the traveling information of the first robot, wherein the first zone range is a zone in which no obstacle exists around the first robot;

determining a second zone range according to the deviation distance and the deviation angle, wherein the second zone range is a minimum range required for controlling the first robot to perform route correction; and controlling the first robot to perform route correction according to the deviation distance and the deviation angle if the first zone range is greater than or equal to the second zone range.

15. The non-transitory computer-readable storage medium according to claim 13, wherein the controlling the first robot to perform route correction according to the deviation distance and the deviation angle comprises:

determining whether an obstacle exists in a safety zone range corresponding to the first robot; and controlling the first robot to perform route correction according to the deviation distance and the deviation angle if no obstacle exists in the safety zone range;

wherein the obstacle comprises a second robot; and the determining whether an obstacle exists in a safety zone range corresponding to the first robot comprises one of:

sending a first query message to the second robot; receiving movement information sent by the second robot according to the first query message, wherein the movement information comprises a movement route and a movement speed; determining, according to the movement route and the movement speed, whether the second robot travels into the safety zone range in preset duration; and determining, if the second robot does not travel into the safety zone range, that no obstacle exists in the safety zone range corresponding to the first robot; and sending a second query message to a control terminal; and receiving a query result sent by the control terminal, wherein the query result is used for indicating whether an obstacle exists in the safety zone range, the query result is determined by the control terminal according to movement information of all second robots, and the movement information comprises a movement route and a movement speed.

16. The non-transitory computer-readable storage medium according to claim 13, wherein the controlling the first robot to perform route correction comprises:

determining, if the deviation distance is greater than or equal to a first preset value and the deviation angle is less than a second preset value, a minimum distance between the first robot and an obstacle around the first robot according to the environment feature; and controlling, if the minimum distance is greater than or equal to a first preset safety distance, the first robot to move in a first preset mode and a second preset mode alternately;

wherein the first preset mode is used for reducing the deviation angle, and the second preset mode is used for reducing the deviation distance.

17. The non-transitory computer-readable storage medium according to claim 13, wherein the controlling the first robot to perform route correction comprises:

determining a second zone range according to the environment feature if the deviation distance is greater than or equal to a first preset value and the deviation angle is less than a second preset value, wherein the second zone range is a zone in which no obstacle exists around the first robot;

controlling, if the second zone range is greater than or equal to a third preset value, the first robot to move in a first preset mode;

controlling, after determining that the first robot moves into a first preset range, the first robot to move in the first preset mode and a second preset mode alternately; and

US 12,566,449 B2

45

46 controlling, if the second zone range is greater than or equal to a fourth preset value and less than a second preset value, the first robot to move in a first preset mode and a second preset mode alternately;

wherein the first preset mode is used for reducing the deviation angle, and the second preset mode is used for reducing the deviation distance.

18. The non-transitory computer-readable storage medium according to claim 13, wherein the controlling the first robot to perform route correction comprises:

controlling, if the deviation angle is greater than or equal to a second preset value and the deviation distance is less than a first preset value, the first robot to move in a first preset mode, and controlling, after the first robot moves into a second preset range, the first robot to move in the first preset mode and a second preset mode alternately;

wherein the first preset mode is used for reducing the deviation angle, and the second preset mode is used for reducing the deviation distance.

19. The non-transitory computer-readable storage medium according to claim 13, wherein the controlling the first robot to perform route correction comprises:

controlling, if the deviation position is greater than or equal to a first preset value and the deviation angle is greater than or equal to a second preset value, the first robot to move in a second preset mode and a first preset mode alternately, wherein the first preset mode is used for reducing the deviation angle, and the second preset mode is used for reducing the deviation distance.

* * * * *